United States Patent [19]
Kawai

[11] Patent Number: 6,034,789
[45] Date of Patent: Mar. 7, 2000

[54] IMAGE READING APPARATUS WITH ADJUSTMENT OF OFFSET/GAIN OF IMAGE SIGNAL

[75] Inventor: Yoshiaki Kawai, Ebina, Japan

[73] Assignee: Ricoh Company, Ltd., Tokyo, Japan

[21] Appl. No.: 09/021,070

[22] Filed: Feb. 9, 1998

[30] Foreign Application Priority Data

Feb. 7, 1997 [JP] Japan .................................. 9-038638

[51] Int. Cl.[7] .................................................. H04N 1/04
[52] U.S. Cl. ......................... 358/474; 358/461; 382/273; 382/274
[58] Field of Search .................................. 358/447, 448, 358/452, 461, 465, 474, 494, 482; 382/194, 201, 270, 273, 244

[56] References Cited

U.S. PATENT DOCUMENTS

| 5,539,202 | 7/1996 | Geagan et al. ........................ 250/369 |
| 5,757,520 | 5/1998 | Takashima ............................. 358/482 |

*Primary Examiner*—Edward L. Coles
*Assistant Examiner*—Mark Wallerson
*Attorney, Agent, or Firm*—Oblon, Spivak, McClelland, Maier & Neustadt, P.C.

[57] ABSTRACT

An image reading apparatus includes an image sensor and an offset adjusting circuit for generating an offset-counterbalancing signal in different levels. The level is selected in accordance with an offset in an image signal. The offset is adjusted by adding an offset-counterbalancing signal to the image signal to output an offset-adjusted image signal. Sample clock signals are generated in different phases. A signal sampling circuit samples the offset-adjusted image signal to output a sampled image signal. A peak value detector detects peak black and peak white values in the sampled image signal upon reading reference black and reference white images. A memory stores the peak black and peak white values in association with the respective corresponding sample clock phases, controller instructs the offset adjusting circuit generate an appropriate level offset-counterbalancing signal, commands the reading of the reference black image to detect a peak black value to determine an offset-counterbalancing value such that a value made by subtracting the offset-counterbalancing value from the peak black value falls within a predetermined appropriate range for the peak black value. A second controller selects a phase at which the peak black and white values fall in the respective predetermined appropriate ranges.

18 Claims, 14 Drawing Sheets

FIG. 6

| PHASE OF SAMPLE CLOCK | PEAK BLACK VALUE | PEAK WHITE VALUE |
|---|---|---|
| P0 | PBV(0) | PWV(0) |
| P1 | PBV(1) | PWV(1) |
| P2 | PBV(2) | PWV(2) |
| P3 | PBV(3) | PWV(3) |
| P4 | PBV(4) | PWV(4) |
| P5 | PBV(5) | PWV(5) |
| P6 | PBV(6) | PWV(6) |
| P7 | PBV(7) | PWV(7) |

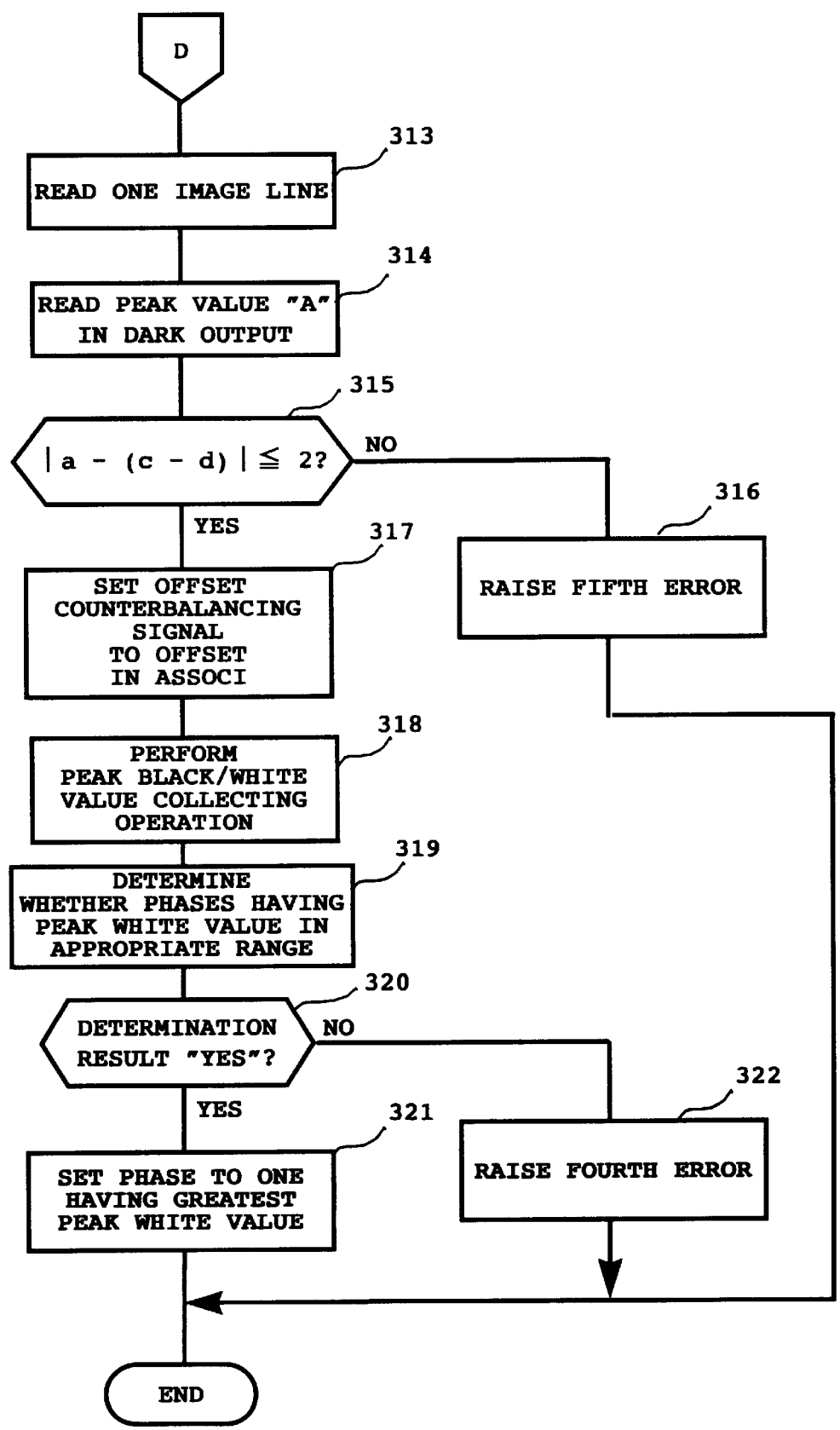

IMAGE READING APPARATUS WITH ADJUSTMENT OF OFFSET/GAIN OF IMAGE SIGNAL

BACKGROUND OF THE INVENTION

1. Field of the Invention

This invention relates to an image reading apparatus, and more particularly to an image reading apparatus which is capable of performing an offset/gain adjustment in an efficient manner and with a simple structure.

2. Discussion of the Background

In a conventional image reading apparatus, an adjustment to an offset element and a gain of an image signal which is output from an image sensor and input to an A/D (analog-to-digital) converter has been performed on the image sensor side. More specifically, an image sensor used in the image reading apparatus normally includes a photoelectric conversion device for reading an image and generating an image signal in accordance with the image and an image signal correction circuit for adjusting an offset element and a gain of the image signal output from the photoelectric conversion device. Therefore, the offset/gain adjustment capability, such as by designed appropriate ranges for offsets and gains, for example, has been determined by the image sensors themselves in conventional image reading apparatus.

However, such an image sensor has a problem. When the image sensor is installed in an image reading apparatus, no matter how precisely the offset/gain adjustment capability is designed for an image sensor, the designed appropriate ranges for the offset/gain, in particular, may not necessarily fall in appropriate ranges for the image signal at an input stage of the A/D converter due to changes in the electrical environment.

Further, even when the offset/gain of the image signal at the input stage of the A/D converter falls in the respective appropriate ranges, the offset/gain may vary out of the designed appropriate ranges due to variations in power for the image reading apparatus, the light amount of a light source for the image sensor to read the image, and so forth caused in the image reading apparatus or for each installation environment. In such a case, it is necessary to take action, such as a replacement of the image sensor itself, for example, so as to repair the problem of the image reading apparatus, in which the offset/gain of the image signal falls outside the designed appropriate ranges.

Therefore, at present, there is no image reading apparatus which is capable of performing the offset/gain adjustment in an efficient manner and with a simple structure.

SUMMARY OF THE INVENTION

Accordingly, an object of the present invention is to provide a novel image reading apparatus which is capable of performing the offset/gain adjustment in an efficient manner and with a simple structure.

To achieve the above-mentioned object, the novel image reading apparatus according to the present invention includes an image sensor for reading an image area by area and generating an image signal in synchronism with clocks for timing pixels of image, the image being composed of a plurality of image areas each including a predetermined number of pixels, and the image including a general image, a reference black image, and a reference white image. Further, the above-described image reading apparatus includes an offset adjusting circuit for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal generated by the image sensor, for adjusting the offset of the image signal by adding the offset-counterbalancing signal at the selected level to the image signal, and for outputting an offset-adjusted image signal. Further, the above-described image reading apparatus includes a sample clock generator for generating sample clock signals in a plurality of different phases in synchronism with the clock signals and for altering one after another the plurality of different phases for each of the sample clocks, a signal sampling circuit for sampling the offset-adjusted image signal in synchronism with the sample clock signals generated by the sample clock generator and for outputting a sampled image signal, a peak value detector for detecting a peak black value in each of the image areas included in the sampled image signal output by the signal sampling circuit when the image sensor reads the reference black image and a peak white value in each of the image areas included in the sampled image signal output by the signal sampling circuit when the image sensor reads the reference white image, and a memory for storing the peak black and peak white values, sampled by the sample clocks at each of the plurality of different phases, in association with the respective corresponding phases. Further, the above-described image reading apparatus includes a first controller for instructing the offset adjusting circuit to temporarily select and set the 0-level for the offset-counterbalancing signal from among the plurality of different levels and to generate the 0-level offset-counterbalancing signal, for commanding the performance of an operation of reading the reference black image and to detect a peak black value in each of the image areas included in the sampled image signal, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, and for instructing the offset adjusting circuit to finally set the level for the offset-counterbalancing signal to the level corresponding to the determined offset-counterbalancing value. Further, the above-described image reading apparatus includes a second controller for selecting, from among the plurality of different phases for the sample clock signals, a phase at which both the peak black and peak white values stored in the memory fall in the respective predetermined appropriate ranges for the peak black and peak white values, and for instructing the sample clock generator to fix the phase for the sample clock signals to sample the offset-adjusted signal at the selected phase.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 is a table which includes a plurality of peak black and peak white values both corresponding to each of eight phases for sample clock signals and which is stored in a memory of the image reading apparatus shown in FIG. 1;

FIGS. 8(A)–8(C) illustrate a flowchart which explains a third procedure of the offset/gain adjusting operation.

DESCRIPTION OF THE PREFERRED EMBODIMENTS

Figure 1:
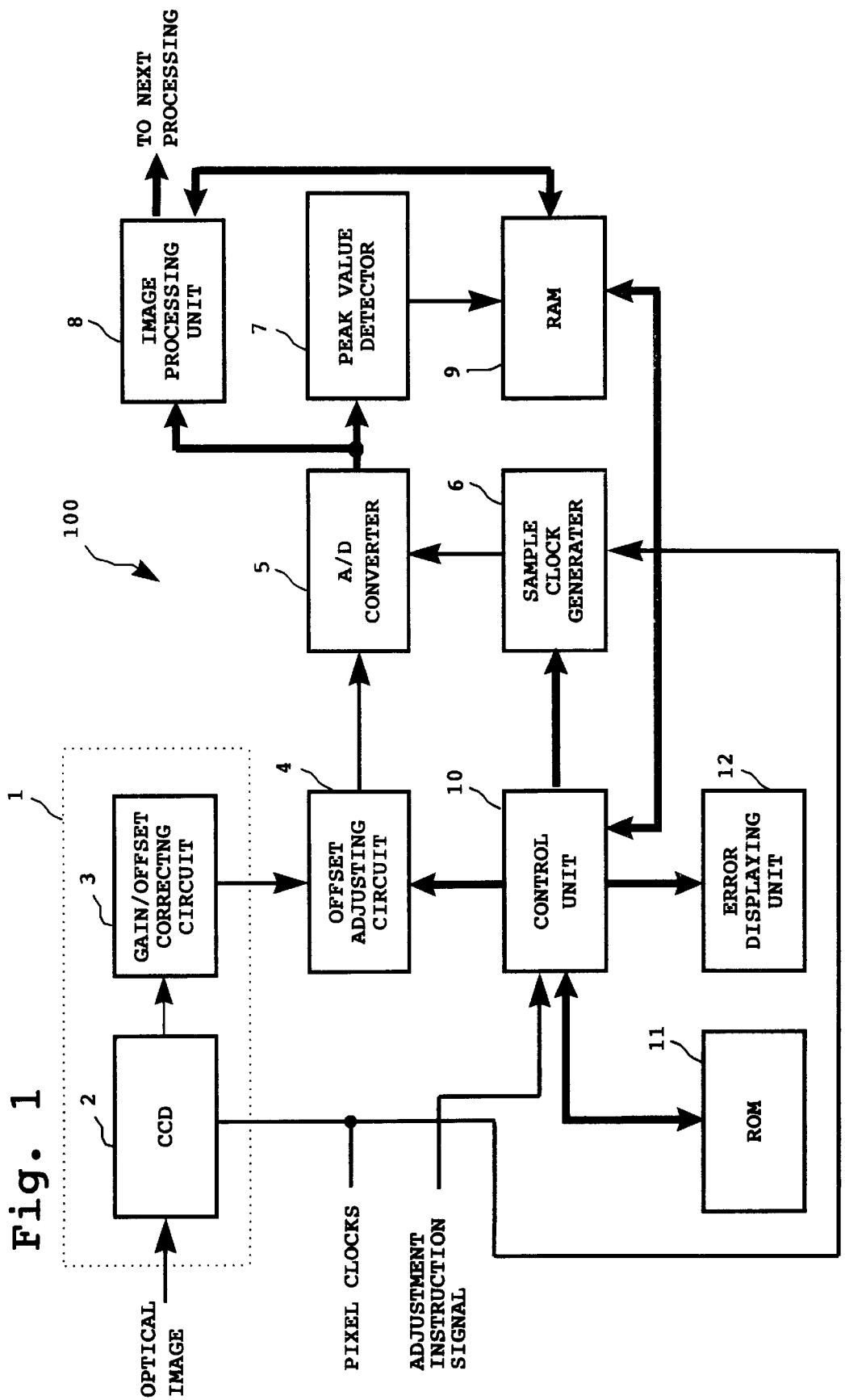
FIG. 1 is a schematic block diagram of the image reading apparatus as a preferred embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram for showing an overall configuration of an image reading apparatus 100 as one of preferred embodiments of the present invention.

The image reading apparatus 100 of FIG. 1 includes an image sensor 1 which includes a photoelectric conversion device such as a CCD (charge-coupled device) 2 and a gain/offset correction circuit 3, an offset adjusting circuit 4, an A/D (analog-to-digital) converter 5, a sample clock generator 6, and a peak value detector 7. Further, the image reading apparatus 100 includes an image processing unit 8, a RAM (random access memory) 9, a control unit 10, a ROM (read only memory) 11, and an error display unit 12.

In the image reading apparatus 100 of FIG. 1, a clock generator (not shown) provides clock signals, which are referred to as pixel clocks, for synchronizing image pixels. The CCD 2 of the image sensor 1 receives the pixel clocks, reads line by line an image of an original sheet in synchronism with the pixel clocks, and outputs a primary image signal which represents the image of the original sheet. The primary image signal output from the CCD 2 is applied to the gain/offset correction circuit 3 and gain and offset thereof are corrected to appropriate levels, so that an output signal from the gain/offset correction circuit 3 is an appropriate image signal as an output signal from the image sensor 1. The signal output from the gain/offset correction circuit 3 is referred to as an image signal A, and is applied to the offset adjusting circuit 4.

The offset adjusting circuit 4 receives an offset level change signal issued by the control unit 10, generates an offset-counterbalancing signal in responding to the offset level change signal, and adds the offset-counterbalancing signal to the image signal A. The offset adjusting circuit 4 then outputs an added signal, which is referred to as an image signal B, and sends it to the A/D converter 5. The A/D converter 5 also receives sample clock signals generated by the sample clock generator 6 and performs an analog-to-digital data conversion in which analog data of the image signal B are quantized by being sampled with the sample clock signals. The A/D converter 5 outputs a sampled signal, which is referred to as an image signal C. In the present embodiment, a reference voltage generating source (not shown) supplies a reference voltage, i.e. 2 volts, for example, so that the image signal B is variable in a range from 0 to 2 volts in responding to the reference voltage and is quantized with an 8-bit-resolution.

The sample clock generator 6 receives the pixel clocks and generates the above-mentioned sample clock signals in synchronism with the pixel clocks. The sample clock signals are supplied to the A/D converter 5, as described above. In addition, the sample clock generator 6 also receives phase altering signals sent from the control unit 10 and changes a phase of the sample clocks from one to another in responding to the phase altering signals.

The peak value detector 7 detects by analyzing the image signal C a pixel that has the greatest value among pixels contained in each line of the image in the main scanning direction and stores the greatest value of each image line, which is referred to as a peak value, at a predetermined address of the RAM 9. The control unit 10 is capable of recognizing the peak value of each image line by reading data of the RAM 9 at the predetermined address. Detection of the peak value of each image line in the greatest value detector 7 can be easily achieved by, for example, performing simple data comparisons. During a process of successively inputting a plurality of pixels that constitute an image line into the greatest value detector 7, an operation of comparing values of first and next pixels and holding a value which is greater so as to compare it with a value of another next pixel is repeated one after another, and the value that is last held is determined as the peak value of the image line.

The image processing unit 8 receives the image signal C and performs image processing operations, such as a shading correction and so forth. After the image processing unit 8, the image signal is transmitted to another stage of image processing operations and may be treated differently depending upon a host apparatus to which the image reading apparatus 100 is installed. For example, the image signal may be treated as print data to be recorded on a recording sheet, display data to be displayed on a monitoring display of a host computer, facsimile data to be transmitted to other terminals, or so forth. A detailed description of the image processing unit 8 is omitted due to the reasons that the present invention is not concerned with it, but with the gain and offset adjustments of the image reading apparatus. The manner of processing the image signal after the A/D converter 5 remains the same as is used in conventional apparatus.

The control unit 10 is a microcomputer for controlling the entire operation of the image reading apparatus 100 in accordance with the control procedure stored in ROM 11, using RAM 9 as a working memory. RAM 9 also works with the image processing unit 8. Further, RAM 9 stores a plurality of the greatest values in the respective image lines, which are detected by the peak value detector 7.

The error display unit 12 includes a plurality of LEDs (light-emitting diode), for example, for distinguishably indicating various errors which will be determined by the control unit 10.

Figure 2:
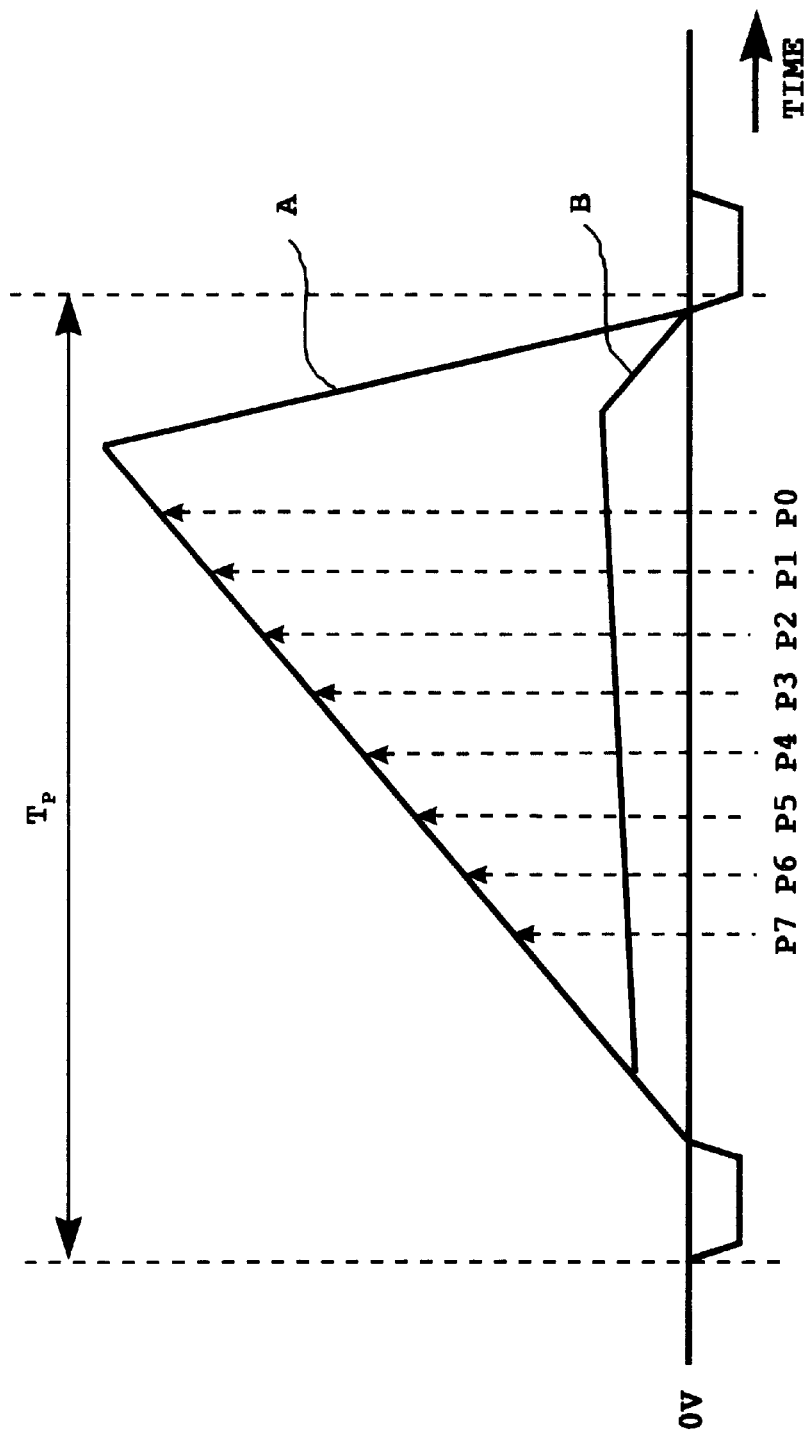
FIG. 2 is a diagram illustrating light and dark output waveforms of an image signal generated by the image reading apparatus shown in FIG. 1.

Next, reference white and reference black images are explained with respect to FIG. 2. Two overlaid exemplary waveforms of the image signal A during a pixel cycle Tp for a specific pixel are illustrated in FIG. 2. One indicated by a letter A is typically generated when the image signal A is a light output signal, and the other indicated by a letter B is typically generated when the image signal A is a dark output signal. The light output signal is produced when the image sensor 1 reads a reference white image from a white reference plate (not shown) irradiated with a light from a light source (not shown), i.e. a xenon lamp, while the dark output signal is produced when the image sensor 1 reads a reference black image from the white reference plate when the light source remains off.

FIG. 2 also shows eight-step phases, i.e. from Piezoelectric to P7, generated by the sample clock generator 6, for each of the sample clocks during each pixel cycle Tp. Each of the eight-step phases is indicated by the phase change signals from the control unit 10. For this purpose, various known techniques can be applied: switching the connections of delaying elements each of which has a different delay time from others relative to a pixel clock to be entered, switching the connections of delaying elements in series so as to change the numbers of the connected delaying elements, and so forth, for example.

In the exemplary waveforms of the image signal A shown in FIG. 2, sampling at P7 makes both the light and dark output values the smallest and sampling at Piezoelectric makes both the light and dark output values the greatest.

Figure 3:
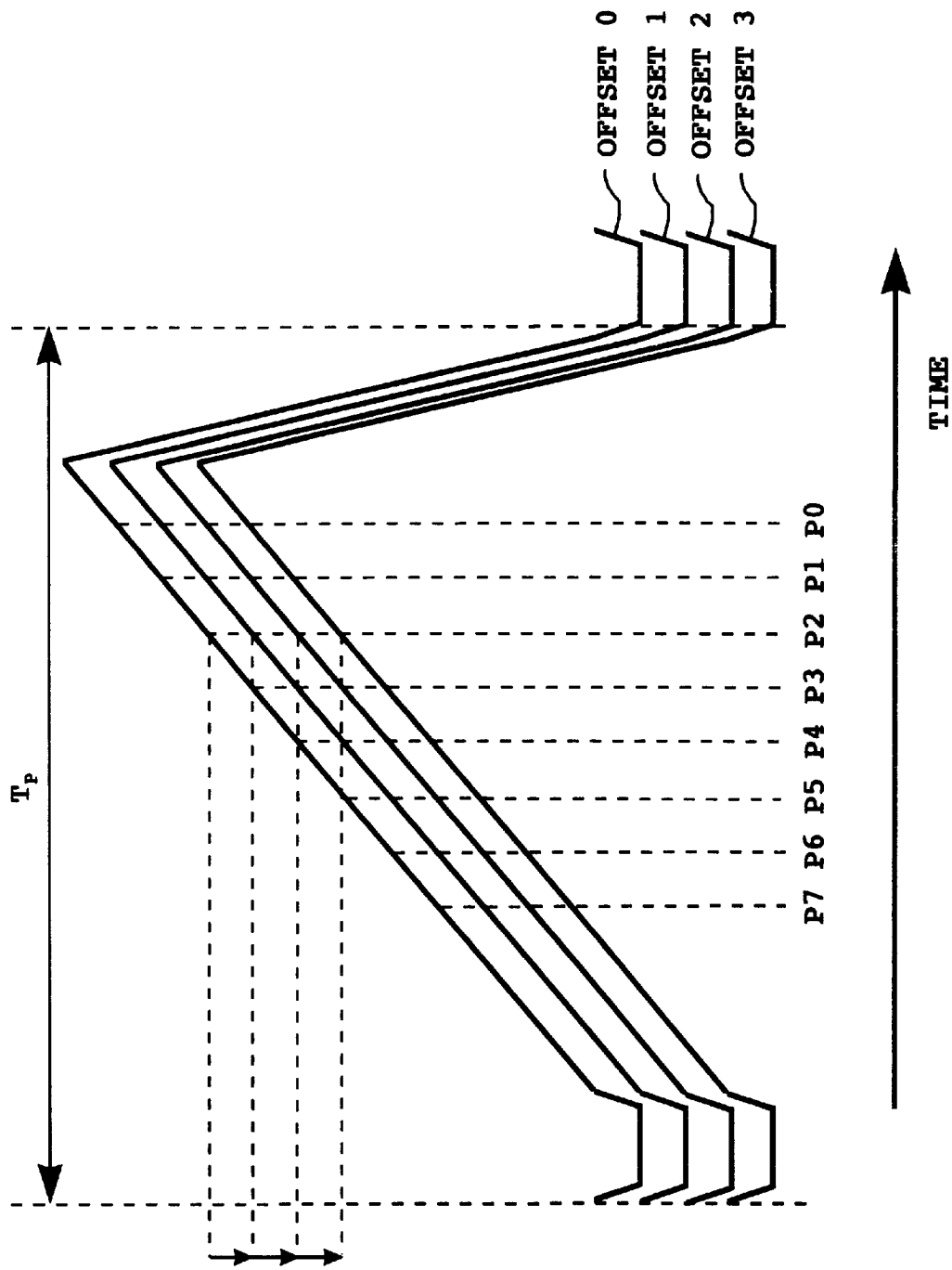
FIG. 3 is a diagram illustrating four light output waveforms of the image signal with four different offset levels.

Next, functions of the offset-counterbalancing signal from the offset adjusting circuit 4 is explained with respect to FIG. 3. FIG. 3 illustrates a chart in which four different waveforms with respect to the image signal A are overlaid. The four waveforms are produced by adding an offset-counterbalancing signal, generated by the offset adjusting circuit 4 and variable from "offset 0" to "offset 3", to the light output of the image signal A.

In the case of "offset 0", the offset-counterbalancing signal is set at an "offset 0" level, by which the image signal A is not changed, and added to the image signal A. In the case of "offset 1", the offset-counterbalancing signal is set at the "offset 1" level and added to the image signal A so that the gray scale of the 256-level gray scale image signal C output from the A/D converter 5 with the 8-bit resolution is reduced by 10 levels. In the case of "offset 2", the offset-counterbalancing signal is set at the "offset 2" level and added to the image signal A so that the gray scale of the image signal C is reduced by 20 levels. In the case of "offset 3", the offset-counterbalancing signal is set at the "offset 3" level and added to the image signal A so that the gray scale of the image signal C is reduced by 30 levels.

As described above, the image signal A input into the A/D converter 5 is an analog signal varying in a range of 0 to 2 volts and is quantized into a 256-level gray scale. Therefore, 1-level gray scale corresponds to an approximate value of 8 mV, and, 10, 20, and 30 levels of gray scale correspond to approximate values of 80 mV, 160 mV, and 240 mV, respectively.

Thus, in accordance with the selection of "offset 0", "offset 1", "offset 2", or "offset 3", the offset adjusting circuit 4 adds the offset-counterbalancing signal, which has a value of 0, −80, −160, or −240 mV, to the image signal A.

Changing levels of the offset-counterbalancing signal, as described above, can be achieved by using circuits which are known. For example, a variable digital signal which is output from the control unit 10 to be used as an offset-counterbalancing signal may be converted into an analog offset-counterbalancing signal and then input to an input terminal of an adder with another input terminal being connected to the image signal A, so that the adder adds the analog offset-counterbalancing signal to the image signal A and outputs the image signal B.

In the above-described preferred embodiment, an appropriate range of the white peak value in the light output included in the image signal C when the image sensor 1 reads the reference white image for one image line is from 140 to 240. Also, an appropriate range of the black peak value in the dark output included in the image signal C when the image sensor 1 reads the reference black image for one image line is from 11 to 20.

The image reading apparatus 100 has the above-described configuration and the control unit 10 thereof performs the offset/gain adjusting operation along the following three different procedures.

Figure 4A:
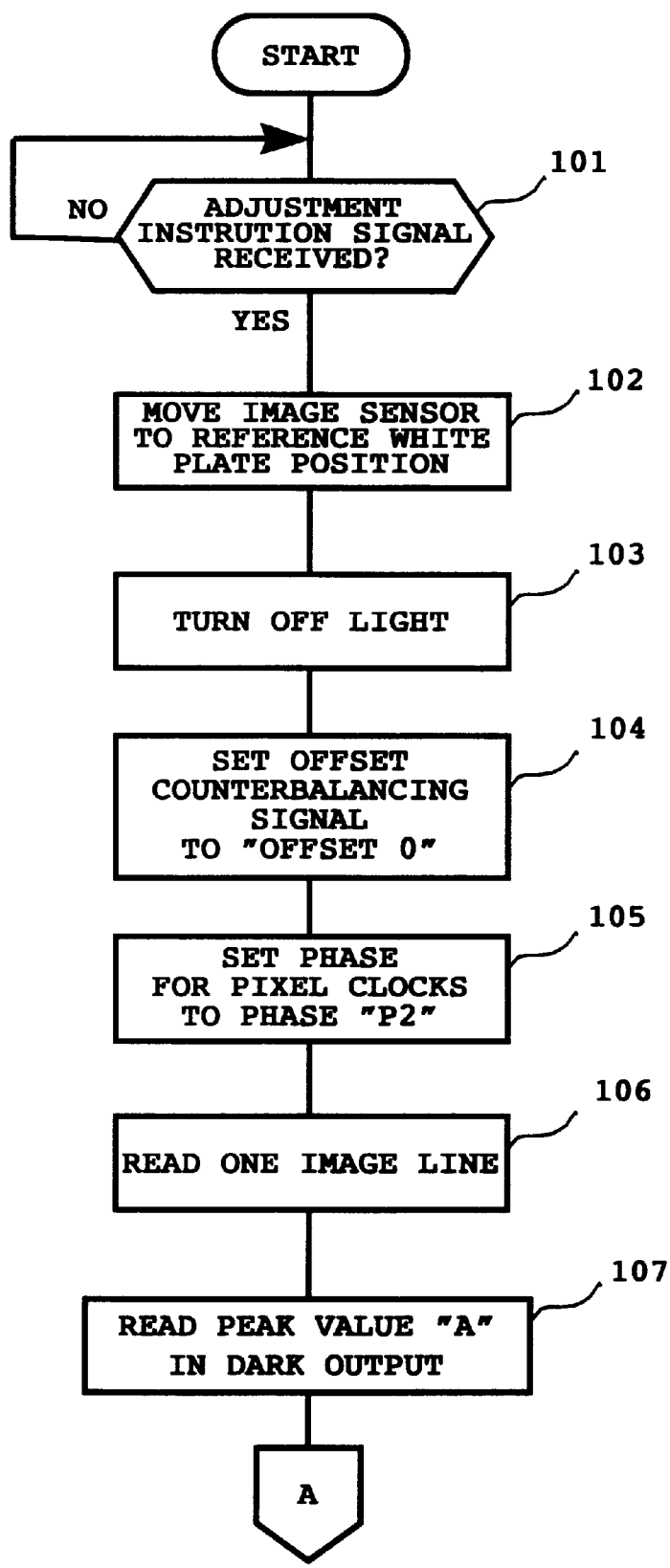
FIGS. 4(A) and 4(B) illustrate a flowchart which explains a first procedure of an offset/gain adjusting operation performed by the image reading apparatus shown in FIG. 1.
Figure 4B:
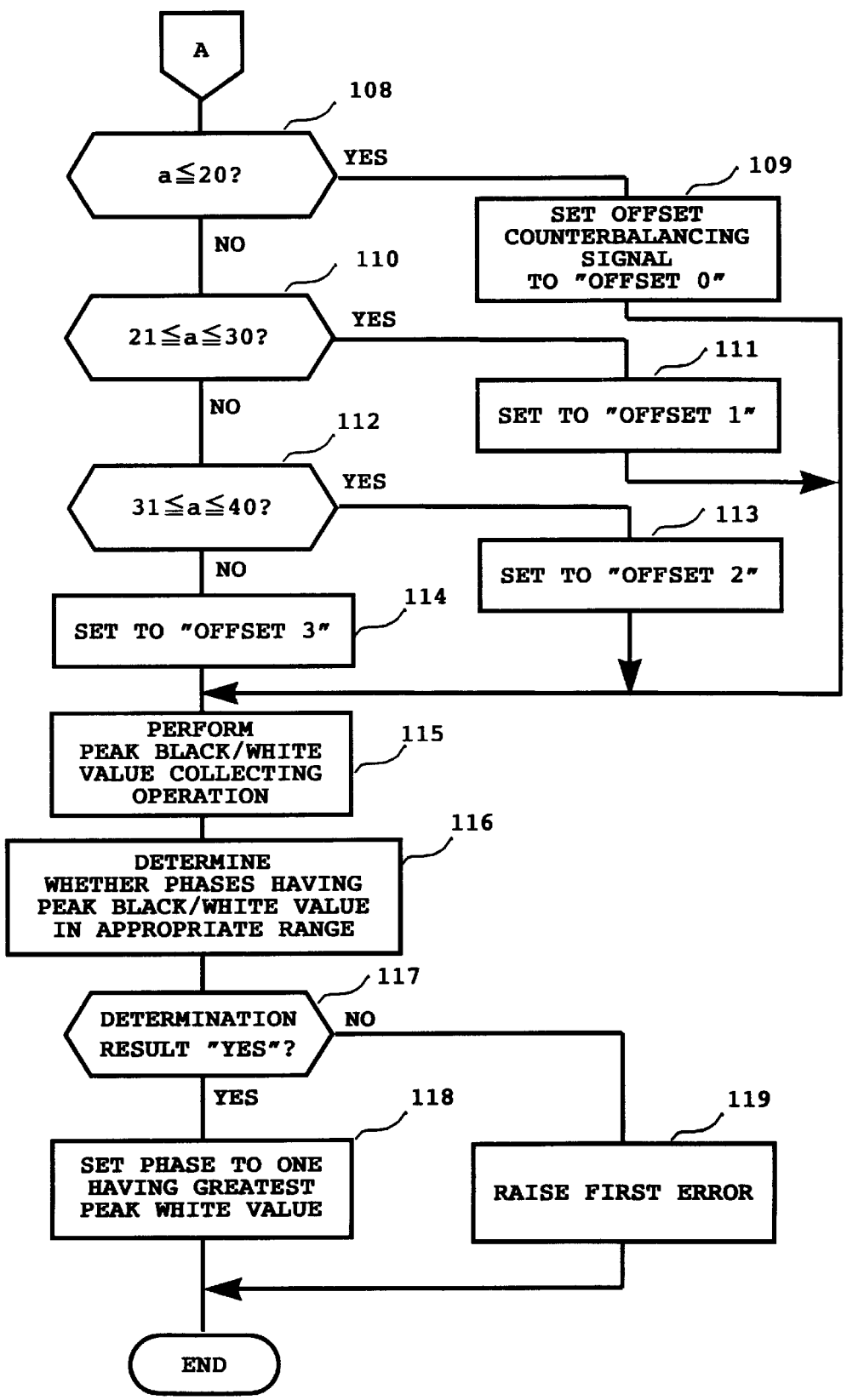

Next, a first procedure of the offset/gain adjusting operation is explained with respect to flowcharts of FIGS. 4(A) and 4(B). In FIG. 4(A), a NO loop is formed in Step S101 and the control unit 10 continues to watch for inputs of adjustment instruction signals to be generated when an operator adjusts the gain/offset input instructions and to be sent from a main control unit (not shown) of the host apparatus to which the image reading apparatus 100 is installed.

When the adjustment instruction signal is input and the result of Step S101 is YES, a sub-scanning mechanism (not shown) is operated so as to move the image sensor 1 to a reference white position at which the reference white plate (not shown) is located in Step S102. Then, in Step S103, the lamp (not shown) for irradiating the reference white plate with light is turned off when the light is lit and is kept off when no light is lit.

In Step S104, the offset-counterbalancing signal is temporarily set to the "offset 0" level, or 0 mV, so that the image signal A is made as the image signal B to be input to the A/D converter 5. Also, the sample clock generator 6 is controlled to set the phase of the sample clock signal to P2, at which a substantially mean black output is output, in Step S105.

Then, the image sensor 1 reads a line of an image in the main scanning direction, in Step S106. At this time, the image to be read is the reference black image and, accordingly, the peak value detector 7 detects the peak value in the black output from the image data which has been read in Step S106 and passed through the A/D converter 5. The control unit 10 reads a value "a", which is the peak value in the black output and stored in the RAM 9, in Step S107.

Further, the control unit 10 proceeds to the steps shown in FIG. 4(B). In Step S108 in FIG. 4(B), the control unit 10 determines whether "a" is equal to or smaller than 20. When "a" is equal to or smaller than 20, the result of Step S108 is YES, and the process proceeds to Step S109 and the offset-counterbalancing signal is finally set to the level of "offset 0", or 0 mV, or reducing no level of gray scale as a gray scale value after the A/D converter 5. When "a" is larger than 20, the result of Step S108 is NO, and the process proceeds to Step S110 in which the control unit 10 determines whether "a" is equal to 21 or 30, or larger than 21 and smaller than 30. When "a" is equal to 21 or 30, or larger than 21 and smaller than 30, the result of Step S110 is YES, and the process proceeds to Step S111 and the control unit 10 controls to finally set the offset-counterbalancing signal to a level of "offset 1", or −80 mV, or reducing 10 levels of gray scale as a gray scale value after the A/D converter 5.

When "a" is larger than 30, the results of Step S110 is NO, and the process proceeds to Step S112 in which the control unit 10 determines whether "a" is equal to 31 or 40, or larger than 31 and smaller than 40. When "a" is equal to 31 or 40, or larger than 31 and smaller than 40, the results of Step S112 is YES, and the process proceeds to Step S113 and the control unit 10 controls to finally set the offset-counterbalancing signal to a level of "offset 2", or −160 mV, or reducing 20 levels of gray scale as a gray scale value after the A/D converter 5 When "a" is larger than 40, the result of Step S112 is NO, and the process proceeds to Step S114 and the control unit 10 controls to finally set the offset-counterbalancing signal to a level of "offset 3", or −240 mV, or reducing 30 levels of gray scale after the A/D converter 5.

In this way, when the image signal A includes an offset element which will be detected as the peak value in the dark output and will substantially be equal to or smaller than 20 as a gray scale value after the A/D converter 5, an offset element included in the image signal B which is converted from the image signal A may be within the predetermined appropriate range of the peak value in the dark output, which is from 11 to 20, without the need of adjusting the level of the image signal A using the offset adjusting circuit 4. In this case, the offset-counterbalancing signal having 0 mV is added to the image signal A so that a signal, which is substantially the same as the image signal A having the offset element within the predetermined appropriate range from 11 to 20 as a gray scale value after the A/D converter 5, is output as the image signal B and input to the A/D converter 5.

Further, when the image signal A includes an offset element which will be detected as the peak value in the dark output and will substantially be equal to 21 or 30, or larger than 21 and smaller than 30 as a gray scale value after the A/D converter 5, the level of the image signal A is needed to be properly adjusted using the offset adjusting circuit 4 so that an offset element included in the image signal B which is converted from the image signal A may be within the predetermined appropriate range of the peak value in the dark output, which is from 11 to 20. In this case, the offset-counterbalancing signal having a level of −80 mV, or reducing 10 levels of gray scale as the value after the A/D converter 5, is added to the image signal A so that a signal which has the offset element adjusted to the predetermined appropriate range from 11 to 20 as a gray scale value after the A/D converter 5 is output as the image signal B and input to the A/D converter 5.

Further, when the image signal A includes an offset element which will be detected as the peak value in the dark output and will substantially be equal to 31 or 40, or larger than 31 and smaller than 40 as a gray scale value after the A/D converter 5, the level of the image signal A is needed to be properly adjusted using the offset adjusting circuit 4 so that an offset element included in the image signal B which is converted from the image signal A may be within the predetermined appropriate range of the peak value in the dark output, which is from 11 to 20. In this case, the offset-counterbalancing signal having a level of −160 mV, or reducing 20 levels of gray scale as the value after the A/D converter 5, is added to the image signal A so that a signal which has the offset element adjusted to the predetermined appropriate range from 11 to 20 as a gray scale value after the A/D converter 5 is output as the image signal B and input to the A/D converter 5.

Further, when the image signal A includes an offset element which will be detected as the peak value in the dark output and will substantially be equal to or larger than 41 as a gray scale value after the A/D converter 5, the level of the image signal A is needed to be properly adjusted using the offset adjusting circuit 4 so that an offset element included in the image signal B which is converted from the image signal A may be within the predetermined appropriate range of the peak value in the dark output, which is from 11 to 20. In this case, the offset-counterbalancing signal having a level of −240 mV, or reducing 30 levels of gray scale as the value after the A/D converter 5, is added to the image signal A so that a signal which has the offset element adjusted to the predetermined appropriate range from 11 to 20 as a gray scale value after the A/D converter 5 is output as the image signal B and input to the A/D converter 5.

Thus, even when the image signal A includes an offset element that exceeds the predetermined appropriate range of the peak value in the dark output, the offset adjusting circuit 4 adjusts the offset element into the predetermined appropriate range and outputs the image signal B, having the offset element adjusted within the predetermined appropriate range, to the A/D converter 5.

After performing the offset adjusting operation in the manner described above, the control unit 10 further performs a gain adjusting operation from Step S115 to the end in FIG. 4(B). As a first step of the gain adjusting operation, the control unit 10 performs a peak black/white value collecting operation, in Step S115, of which detail is explained below with respect to FIGS. 5(A) and 5(B).

Figure 5A:
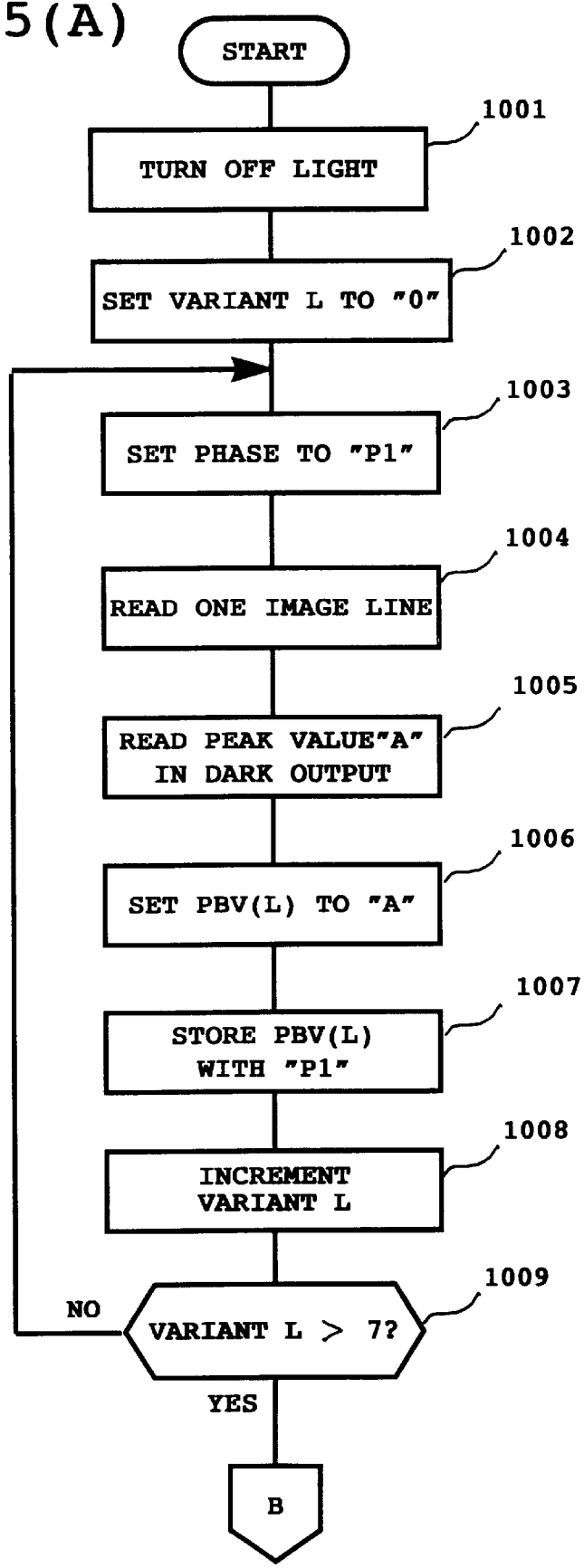
FIGS. 5(A) and 5(B) illustrate a flowchart which explains a peak black/white value collecting operation included in the offset/gain adjusting operation shown in FIG. 4(B)

In Step S1001 shown in FIG. 5(A), the control unit 10 controls the lamp, so that the lamp is turned off when the light is lit and is kept off when no light is lit. At this time, the image sensor 1 is located at the position for reading the reference white plate. Then, the control unit 10 sets a variant L for counting a number of performance times to 0 in Step S1002 and changes the phase of the sample clock signals generated by the sample clock generator 6 from P0 to P1 in Step S1003. The control unit 10 further controls the image sensor 1 to read a line of the reference white plate with no light, or the reference black image, in Step S1004. Then, in Step S1005, the control unit 10 reads the value "a", which is the peak value in the black output detected by the peak value detector 7 and which is stored in the RAM 9. Further, the control unit 10 assigns the read peak value "a" in the dark output, which is treated as the peak black value at the present phase, to a variant PBV(L), in Step S1006. The variant PBV(L) in relation to the phase P1 is stored in the RAM 9, in Step S1007. Then, the variant L is incremented by one in Step S1008.

In the Step S1009, the control unit 10 determines whether the value of the variant L exceeds 7. A NO loop is formed by a connection between Step S1009 and Step S1003, and causes the above-described operations from Step S1003 through to Step S1008 to repeat until the value of the variant L exceeds 7. In this way, the peak black values from PBV(0) to PBV(7) corresponding to the sample phases from P0 to P7, respectively, are collected and stored in RAM 9.

Figure 5B:
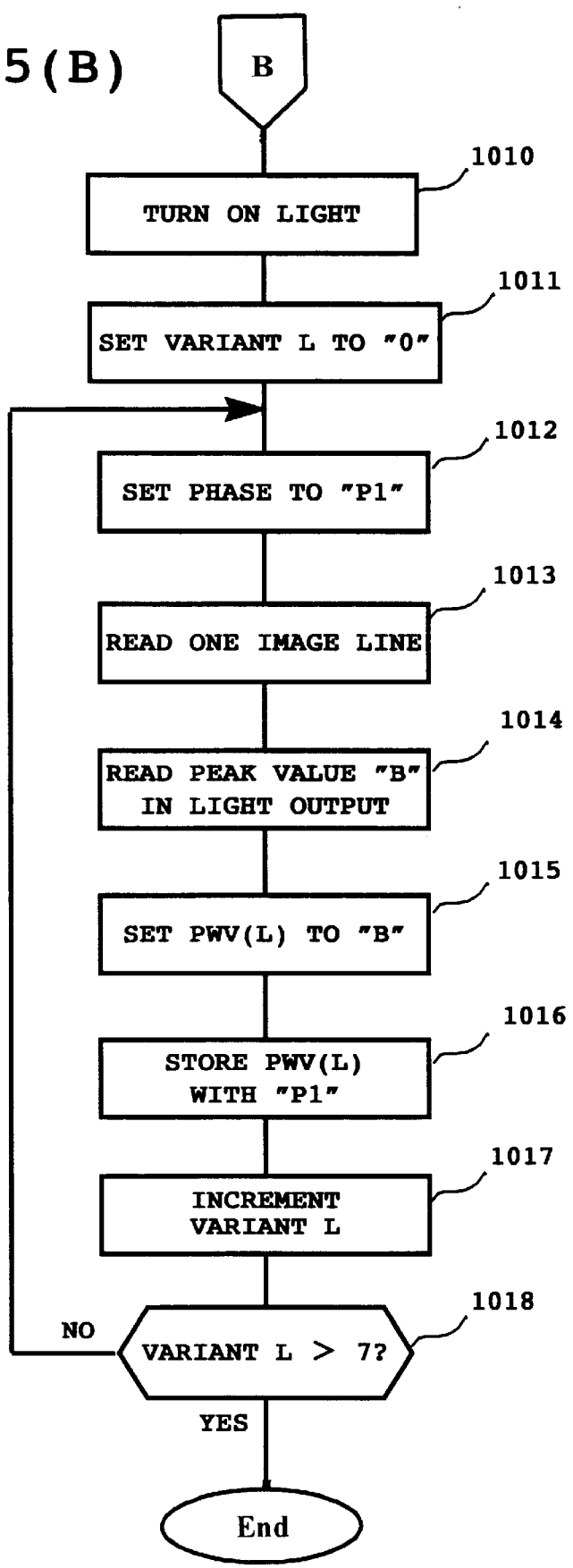

Further, the control unit 10 turns on the lamp which has been off, in Step S1010 shown in FIG. 5(B). At this time, the image sensor 1 is located at the position for reading the reference white plate. Then, the control unit 10 sets a variant L to 0 in Step S1011 and changes the phase of the sample clocks generated by the sample clock generator 6 from P0 to P1 in Step S1012. The control unit 10 further controls the image sensor 1 to read a line of the reference white plate irradiated with the light, or the reference white image, in Step S1013. Then, in Step S1014, the control unit 10 reads the value "b", which is the peak value in the white output detected by the peak value detector 7 and which is stored in RAM 9. Further, the control unit 10 assigns the read peak value "b" in the light output, which is treated as the peak white value at the present phase, to a variant PWV(L), in Step S1015. The variant PWV(L) in relation to the phase P1 is stored in the RAM 9, in Step S1016. Then, the variant L is incremented by one in Step S1017.

In Step S1018, the control unit 10 determines whether the value of the variant L exceeds 7. A NO loop is formed by a connection between Step S1018 and Step S1012, and causes the above-described operations from Step S1012 through Step S1017 to repeat until the value of the variant L exceeds 7. In this way, the peak white values from PWV(0) to PWV(7) corresponding to the sample clocks at the phases from P0 to P7, respectively, are collected and stored in RAM 9.

As shown in FIG. 6, the peak black values from PBV(0) to PBV(7) and the peak white values from PWV(0) to PWV(7), corresponding to the sample clock signals at phases from P0 to P7, respectively, can be collected and stored in RAM 9 as a result of performing the peak black/white value collecting operation which is performed in Step S115 in FIG. 4(B).

After completion of the peak black/white value collecting operation in Step S115 in FIG. 4(B), the process proceeds to Step S116. The control unit 10 reads RAM 9 to examine that the collected peak white values are in the predetermined appropriate range from 140 to 240 and that at least one of the phases from P0 to P7 has a peak black value which is in the predetermined appropriate range from 11 to 20. In Step S117, the control unit 10 determines the examination result of Step S116. When the examination result is determined as YES in Step S117, the process proceeds to Step S118 and the control unit 10 selects a phase which has the greatest peak white value among the other phases which have both the peak black and peak white values in the predetermined appropriate ranges, respectively. Further, in Step S118, the control unit 10 sets the sample clock generator 6 to generate the sample clock signals at the thus-selected phase.

Thus, the offset and gain caused in the image sensor 1 can be corrected to the predetermined appropriate range in the stages of the image signals A, B, and C. Even if the offset and gain in the image sensor 1 varies out of the predetermined appropriate range to some extent, it can be adjusted by changing the levels of offset-counterbalancing signal by the offset adjusting circuit 4 or the phases of sample clock signals generated by the sample clock generator 6.

When the examination result is determined as NO in Step S117, the process proceeds to Step S119 and the control unit 10 determines that at least one of the peak black and peak white values are out of the respective predetermined appropriate ranges and that the offset and gain of the image sensor 1 can not be adjusted to the respective predetermined appropriate ranges by changing the levels of offset-counterbalancing signal by the offset adjusting circuit 4 or the phases of sample clocks generated by the sample clock generator 6. Further, the control unit 10 sends a signal for representing a first error, which is an error of the offset and gain of the image sensor 1, to the error display unit 12 so as to indicate an error status on the error display unit 12 and to end the process. From the error status, the operator can recognize that the operation has ended in failure because the offset or gain are not sufficiently adjusted and take necessary actions such as replacing the image sensor 1 and so forth.

In this way, the image reading apparatus 100 is capable of adjusting the peak black and peak white values within the respective predetermined appropriate ranges by changing the level of offset-counterbalancing signal and the phase of sample clock signals to the most suitable ones, so as to convert the image signal A from the image sensor 1 into the image signal B at the preferable offset and gain levels and to read the image in the most preferable condition.

In addition, while the conventional image reading apparatus allows the offset of the image sensor 1 only within a narrow range, for example, from 11 to 20, the image reading apparatus 100 is capable of allowing the offset of the image sensor 1 in a wider range, for example, from 11 to 50 because it can adjust the offset to a range, for example, from 11 to 20 at the stage of the image signal B. In other words, the image reading apparatus 100 is capable of absorbing the variations in the offset caused in the host apparatus and/or the image sensor 1.

Figure 7A:
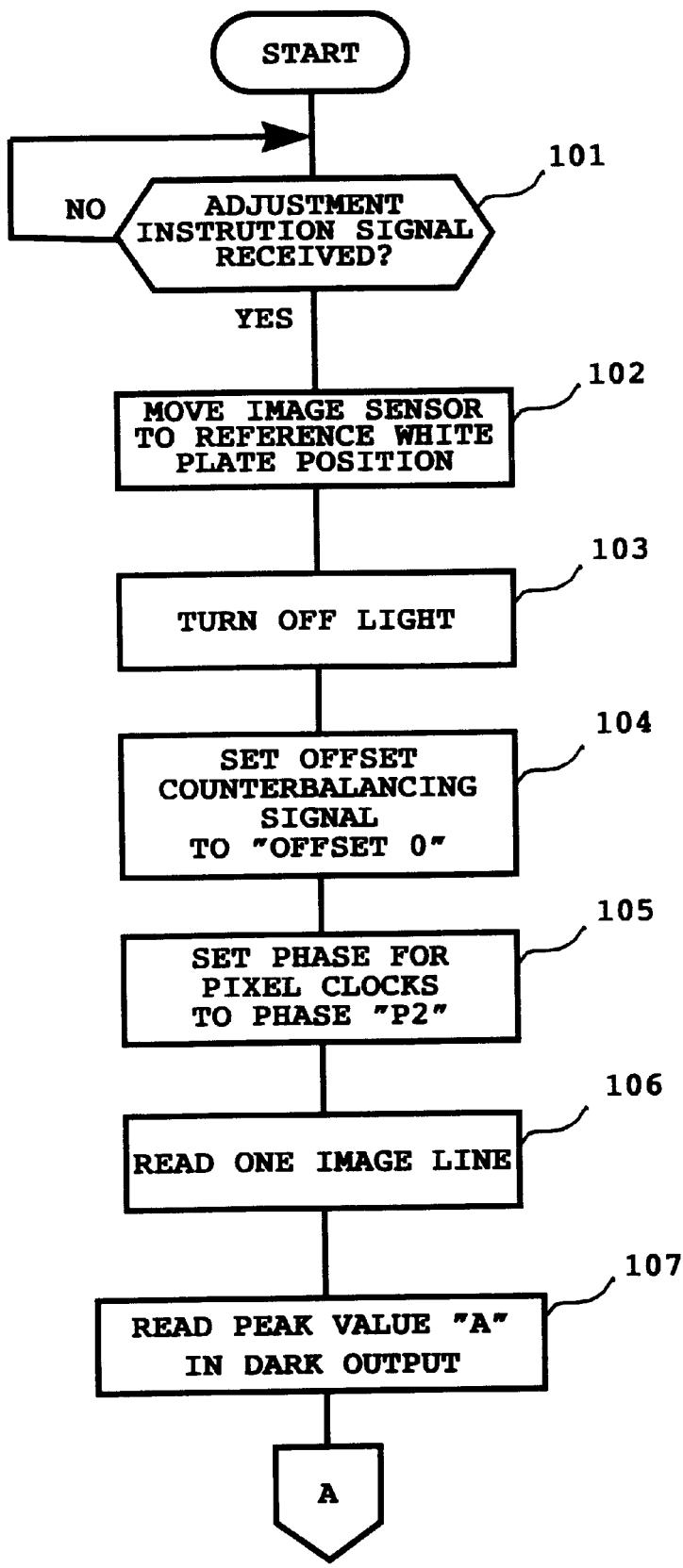
FIGS. 7(A)–7(C) illustrate a flowchart which explains a second procedure of the offset/gain adjusting operation.
Figure 7B:
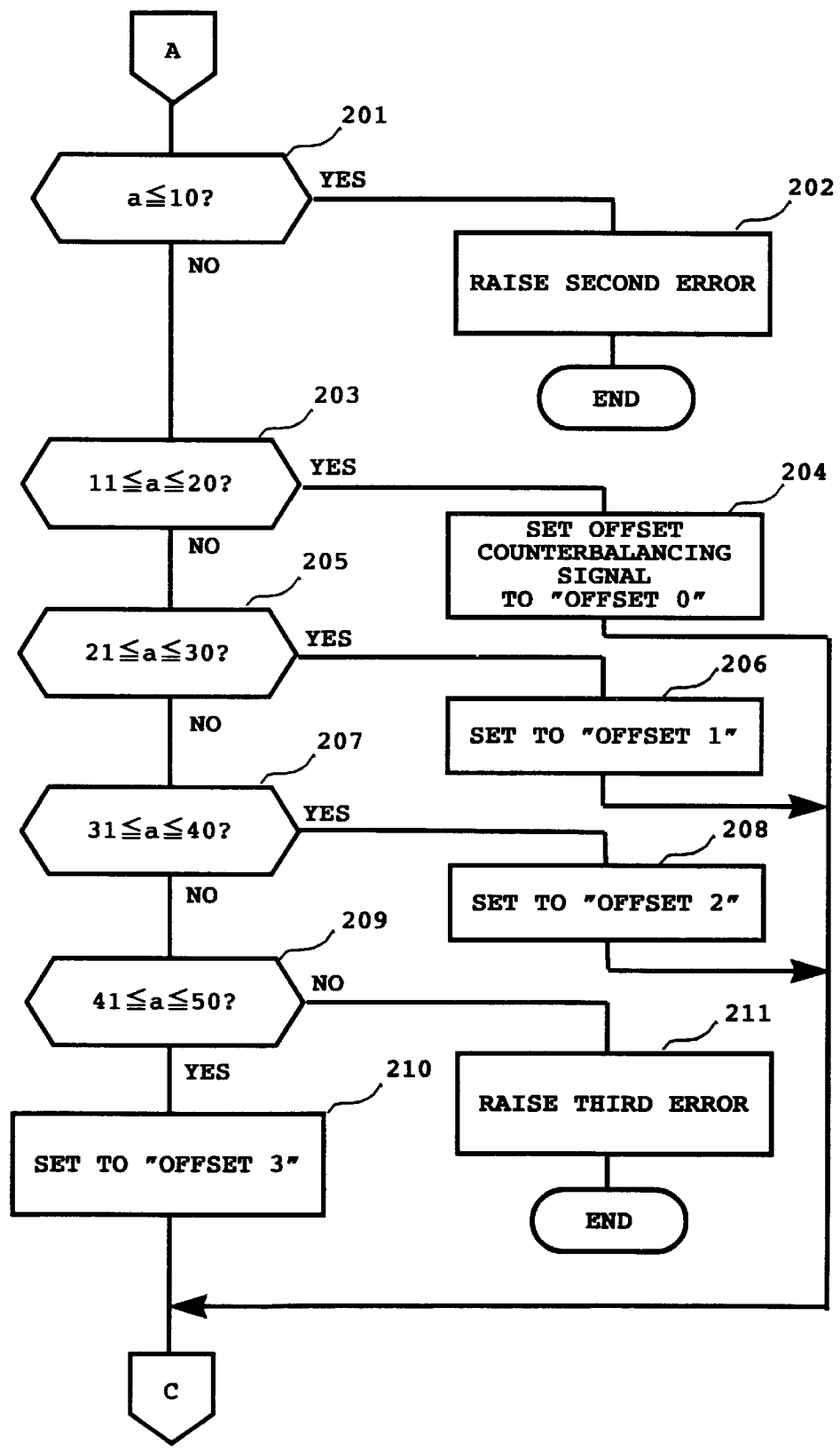
Figure 7C:
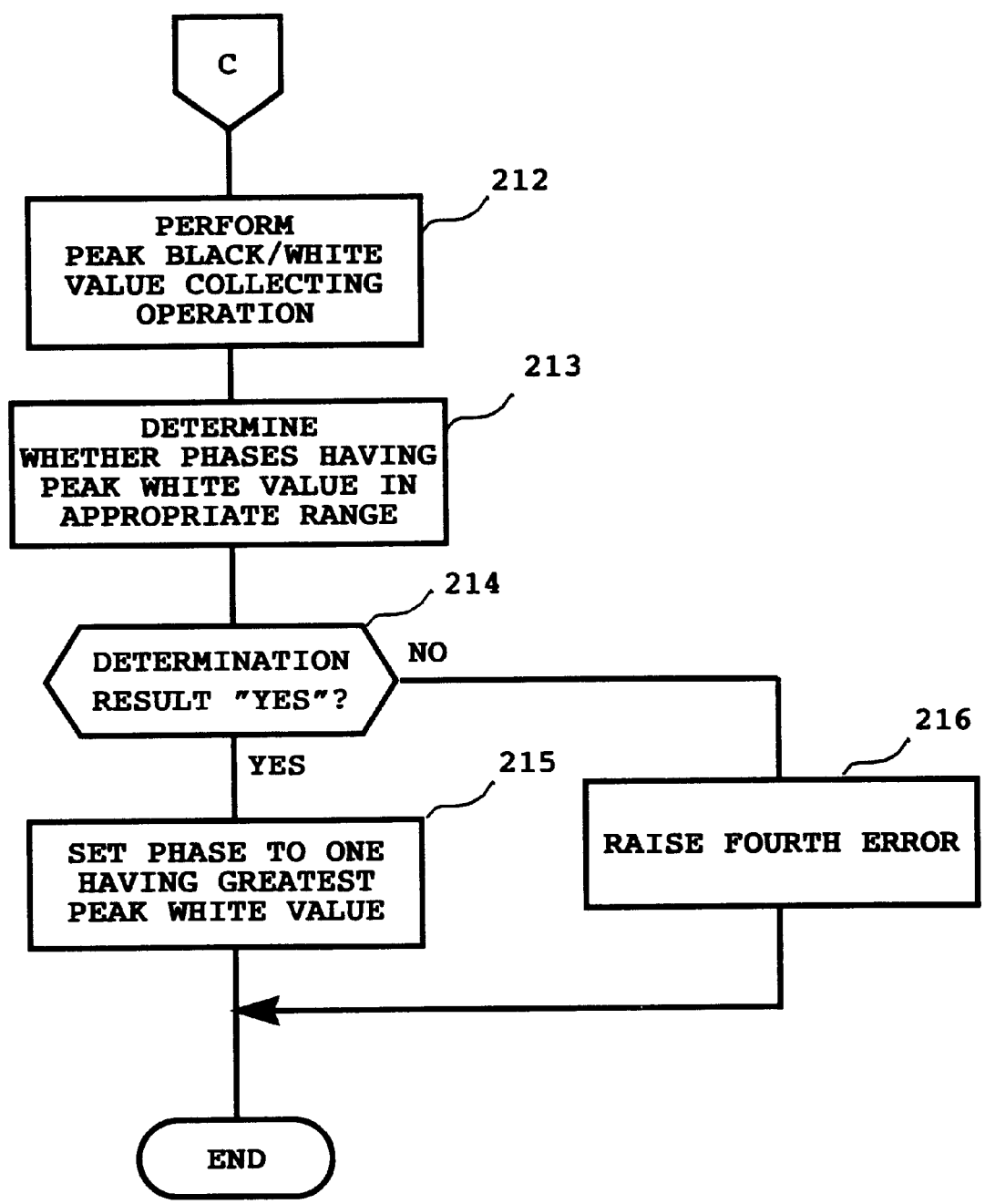

Next, a second procedure of the offset/gain adjusting operation is explained with respect to flowcharts of FIGS. 7(A)–7(C). Since the operation steps shown in FIG. 7(A) are similar to those in FIG. 4(A), a description on the steps of FIG. 7(A) is omitted.

In FIG. 7(B), the control unit 10 determines whether the peak black value "a" is equal to or smaller than 10, in Step S201. When the peak black value "a" is equal to or smaller than 10, the result of Step S201 is YES, and the control unit 10 sends a signal for representing a second error, which is an error of the peak black value "a" exceeding the lower limit 11 in gray scale, to the error display 12 in Step S202, indicating that the process has ended in failure. This is because it is not possible to adjust the peak black value "a", which is smaller than the lower limit, to the predetermined appropriate range from 11 to 20 using the offset-counterbalancing signal which is a negative signal.

When the peak black value "a" is equal to 11 or 20, or larger than 11 and smaller than 20, the result of Step S201 is NO and the process proceeds to Step S203 in which the control unit 10 determines whether the peak black value "a" is equal to 11 or 20, or larger than 11 and smaller than 20. In this case, the result of Step S203 is YES and the process proceeds to Step S204. Then, the offset-counterbalancing signal is finally set to the level of "offset 0", or 0 mV, or reducing no level of gray scale as a gray scale value after the A/D converter 5, in Step S204.

When the peak black value "a" is equal to 21 or 30, or larger than 21 and smaller than 30, the result of Step S203 is NO and the process proceeds to Step S205 in which the control unit 10 determines whether the peak black value "a" is equal to 21 or 30, or larger than 21 and smaller than 30. In this case, the result of Step S205 is YES and the process proceeds to Step S206. Then, the offset-counterbalancing signal is finally set to the level of "offset 1", or –80 mV, or reducing 10 levels of gray scale as a gray scale value after the A/D converter 5, in Step S206.

When the peak black value "a" is equal to 31 or 40, or larger than 31 and smaller than 40, the result of Step S205 is NO and the process proceeds to Step S207 in which the control unit 10 determines whether the peak black value "a" is equal to 31 or 40, or larger than 31 and smaller than 40. In this case, the result of Step S207 is YES and the process proceeds to Step S208. Then, the offset-counterbalancing signal is finally set to the level of "offset 2", or –160 mV, or reducing 20 levels of gray scale as a gray scale value after the A/D converter 5, in Step S208.

When the peak black value "a" is equal to 41 or 50, or larger than 41 and smaller than 50, the result of Step S207 is NO and the process proceeds to Step S209 in which the control unit 10 determines whether the peak black value "a"

is equal to 41 or 50, or larger than 41 and smaller than 50. In this case, the result of Step S209 is YES and the process proceeds to Step S210. Then, the offset-counterbalancing signal is finally set to the level of "offset 3", or −240 mV, or reducing 30 levels of gray scale as a gray scale value after the A/D converter 5, in Step S210.

When the peak black value "a" is equal to or larger than 51, the result of Step S209 is NO, and the process proceeds to Step S211 and the control unit 10 sends a signal representing a third error, which is an error of the peak black value "a" exceeding the upper limit 50 in gray scale, to the error display 12 in Step S211, indicating that the process has ended in failure. This is because the peak black value "a" is too great beyond the upper limit to be adjusted to the predetermined appropriate range from 11 to 20 using the offset-counterbalancing signal since the offset-counterbalancing signal is capable of compensating for a value of gray scale only up to 31.

Thus, the image signal A, including an offset element which will be detected as the peak value in the dark output and will be within the range from 11 to 50 as a gray scale value after the A/D converter 5, can be converted using an appropriate offset-counterbalancing signal into the image signal B in such a way that the offset and gain of the image signal B are in the predetermined appropriate range for the peak value in the dark output, which is from 11 to 20.

Further, the control unit 10 performs a gain adjustment operation, of which operation steps are shown in FIG. 7(C). In Step S212 of FIG. 7(C), the control unit 10 performs the peak black/white value collecting operation which is the operation performed in Step S115 shown in FIG. 4(B).

After completing the peak black/white value collecting operation in Step S212, the process proceeds to Step S214 and the control unit 10 examines an existence of at least one peak white value which is within the predetermined appropriate range from 140 to 240 at one of the phases from Piezoelectric to P7. Then, in Step S214, the control unit 10 determines the examination result of Step S213. When the examination result is determined as YES in Step S214, the process proceeds to Step S215 and the control unit 10 reads the peak black and white values stored in RAM 9 so as to select phases, which have both peak black and peak white values in the respective predetermined appropriate ranges, among all the peak black and white values stored in the RAM 9. Further, in Step S215, the control unit 10 selects a phase, which has the greatest peak white value among the others, and sets the sample clock generator 6 to generate the sample clocks at the thus-selected phase.

In the manner as described above, most of the offset and gain, which is caused on the image signal A sent from the image sensor 1, can be eliminated through the offset adjusting circuit 4 and, as a result, the image signal A is converted into the image signal B. Then, the image signal B is input to the A/D converter 5 and converted into the image signal C through the sampling operation of the A/D converter 5. Accordingly, the offset and gain at the stage of the image signal C is adjusted to the level in the predetermined appropriate range. Even if the offset and gain from the image sensor 1 varies out of the predetermined appropriate range to some extent, it can be adjusted by changing the levels of offset-counterbalancing signal by the offset adjusting circuit 4 or the phases of sample clocks generated by the sample clock generator 6.

When the examination result is determined as NO in Step S214, the process proceeds to Step S216 and the control unit 10 determines that none of the peak white values is in the predetermined appropriate range and that the gain of the image sensor 1 can not be adjusted to the predetermined appropriate range even by changing the phase of sample clocks. Further, in Step S216, the control unit 10 sends a signal representing a fourth error, which is the error of gain, or the peak white value, to the error display unit 12 so as to indicate an error status on the error display unit 12, and the process has ended in failure.

From the various error status displayed on the error display unit 12 in accordance with the cases as indicated in Steps S119, S202, S211, and S216, the operator can recognize that the cause of failure is an excessively low or high offset level, or no existence of a sample clock phase which can set an appropriate level of gain, thereby taking counter actions suitable for the error which has occurred.

Figure 8A:
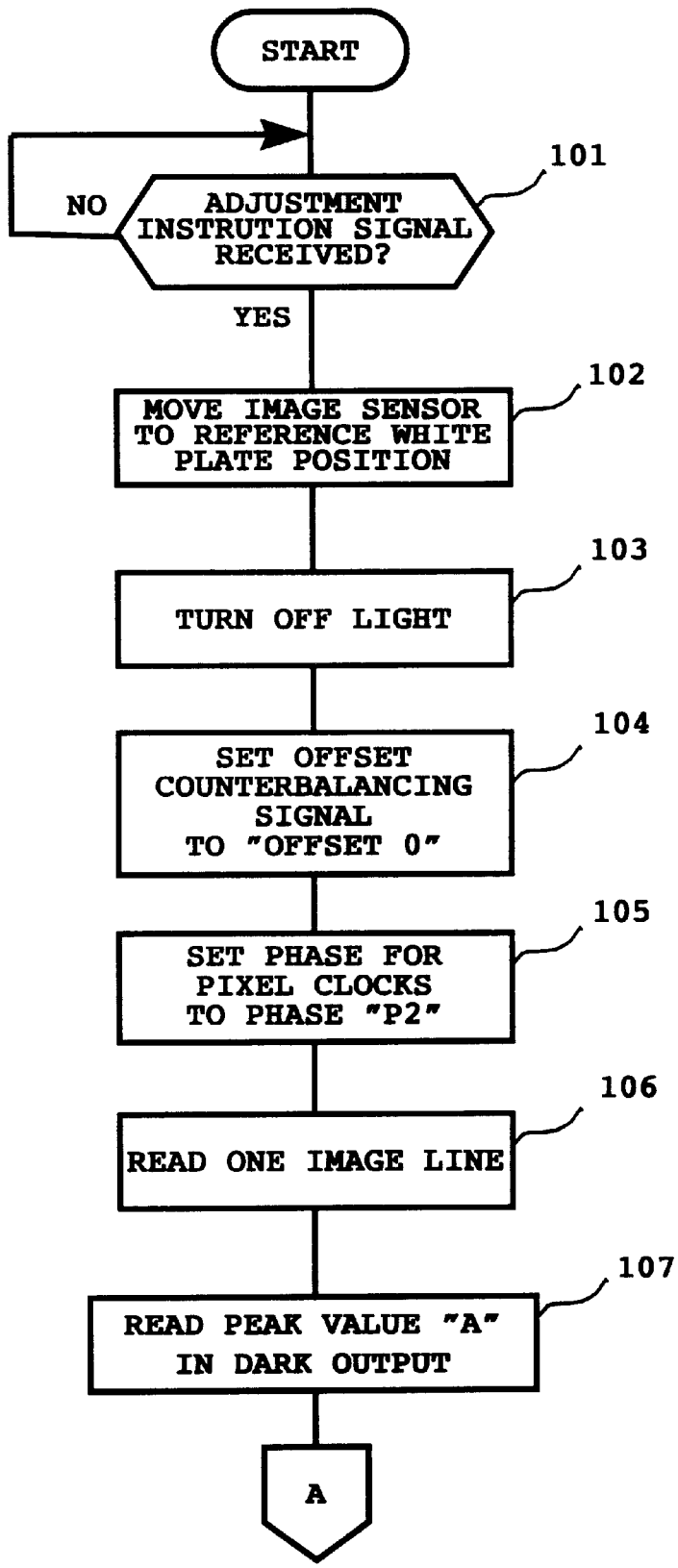
Figure 8B:
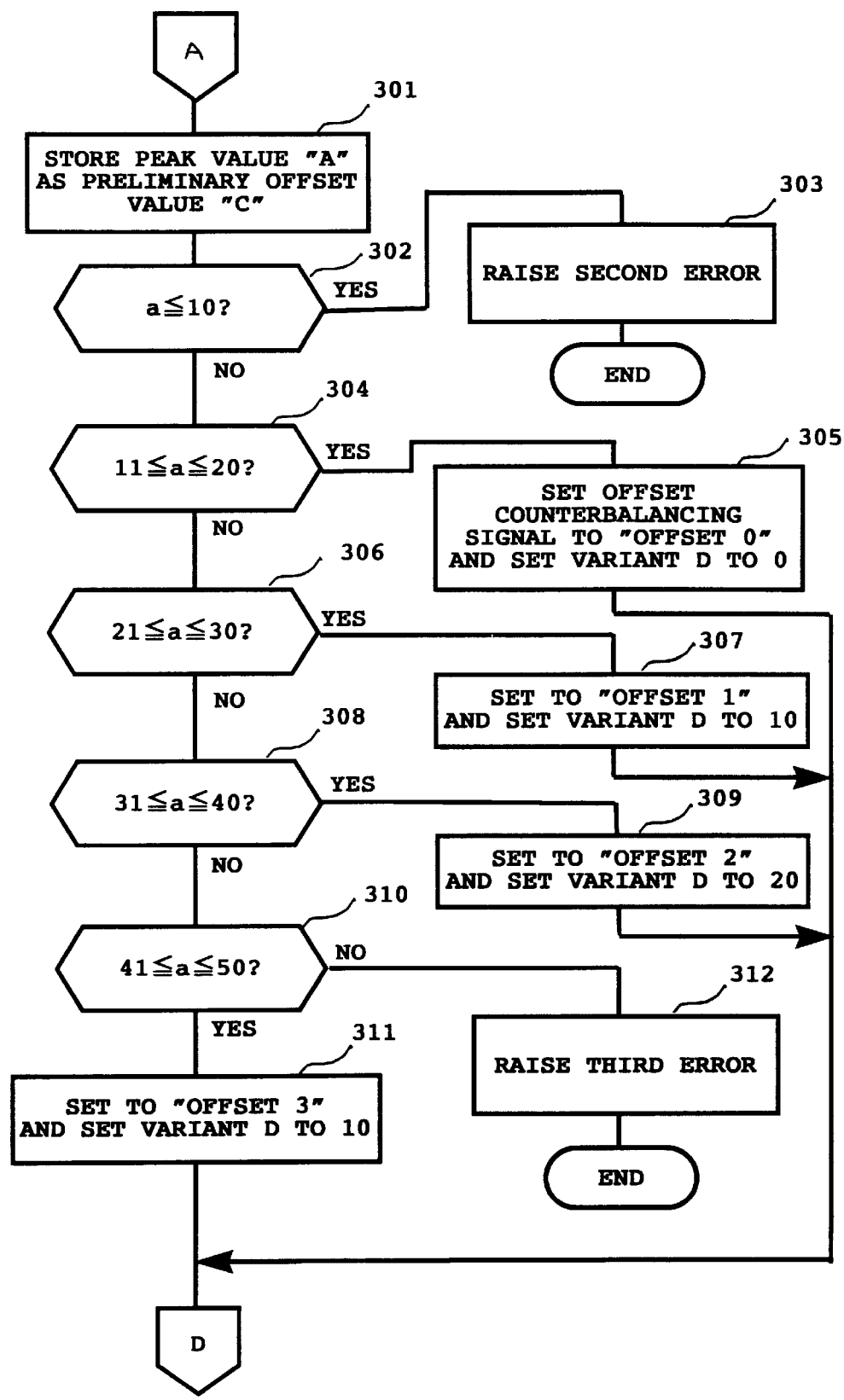

Next, a third procedure of the offset/gain adjusting operation is explained with respect to flowcharts of FIGS. 8(A)–8(C). Since operation steps shown in FIG. 8(A) are similar to those in FIG. 4(A), a description of the steps of FIG. 8(A) is omitted.

In FIG. 8(B), the control unit 10 stores the peak black value "a" in the dark output as a preliminary offset value "c" to the RAM 9, in Step S301. Then, the control unit 10 determines whether the peak black value "a" is equal to or smaller than 10, in Step S302. When the peak black value "a" is equal to or smaller than 10, the result of Step S302 is YES, and the control unit 10 sends a signal representing the second error, which is the error of the peak black value "a" exceeding the lower limit 11 in gray scale, to the error display 12 in Step S303, indicating that the process has ended in failure. The second error is caused because the peak black value "a" smaller than the lower limit can not possibly be adjusted to the predetermined appropriate range from 11 to 20 using the offset-counterbalancing signal since the offset-counterbalancing signal is a negative signal.

When the peak black value "a" is equal to 11 or 20, or larger than 11 and smaller than 20, the result of Step S302 is NO and the process proceeds to Step S304 in which the control unit 10 determines whether the peak black value "a" is equal to 11 or 20, or larger than 11 and smaller than 20. In this case, the result of Step S304 is YES and the process proceeds to Step S305. Then, the offset-counterbalancing signal is temporarily set to the level of "offset 0", or 0 mV, or reducing no level of gray scale as a gray scale value after the A/D converter 5, and a value 0 for representing zero levels of gray scale is set to a variant d, in Step S305.

When the peak black value "a" is equal to 21 or 30, or larger than 21 and smaller than 30, the result of Step S304 is NO and the process proceeds to Step S306 in which the control unit 10 determines whether the peak black value "a" is equal to 21 or 30, or larger than 21 and smaller than 30. In this case, the result of Step S306 is YES and the process proceeds to Step S307. Then, the offset-counterbalancing signal is temporarily set to the level of "offset 1", or −80 mV, or reducing 10 levels of gray scale as a gray scale value after the A/D converter 5, and a value 10 for representing 10 levels of gray scale is set to the variant d, in Step S307.

When the peak black value "a" is equal to 31 or 40, or larger than 31 and smaller than 40, the result of Step S306 is NO and the process proceeds to Step S308 in which the control unit 10 determines whether the peak black value "a" is equal to 31 or 40, or larger than 31 and smaller than 40. In this case, the result of Step S308 is YES and the process proceeds to Step S309. Then, the offset-counterbalancing signal is temporarily set to the level of "offset 2", or −160 mV, or reducing 20 levels of gray scale as a gray scale value after the A/D converter 5, and a value 20 for representing 20 levels of gray scale is set to the variant d, in Step S309.

When the peak black value "a" is equal to 41 or 50, or larger than 41 and smaller than 50, the result of Step S308 is NO and the process proceeds to Step S310 in which the control unit 10 determines whether the peak black value "a" is equal to 41 or 50, or larger than 41 and smaller than 50. In this case, the result of Step S310 is YES and the process proceeds to Step S311. Then, the offset-counterbalancing signal is temporarily set to the level of "offset 3", or −240 mV, or reducing 30 levels of gray scale as a gray scale value after the A/D converter 5, and a value 30 for representing 30 levels of gray scale is set to a variant d, in Step S311.

When the peak black value "a" is equal to or larger than 51, the result of Step S310 is NO, and the process proceeds to Step S312 and the control unit 10 sends a signal representing the third error, which is the error of the peak black value "a" exceeding the upper limit 50 in gray scale, to the error display 12 in Step S312, indicating that the process has ended in failure. This is because the peak black value "a" is too great beyond the upper limit to be adjusted to the predetermined appropriate range from 11 to 20 using the offset-counterbalancing signal since the offset-counterbalancing signal is capable of compensating for a value of gray scale only up to 31.

Upon temporarily setting the offset-counterbalancing signal, the control unit 10 reads a line of the reference black image in Step S313, shown in FIG. 8(C). Then, the control unit 10 selects the peak black value "a" in the dark output which is stored in RAM 9, in Step S314. At this time, the peak black value "a" in the dark output is equal to the peak black value in the dark output contained in the image signal B which is produced by adding the image signal A to the offset-counterbalancing signal set through the operations of Steps S302 to S310, provided that the offset adjusting circuit 4 properly changes the offset-counterbalancing signal.

Therefore, the present peak black value "a" in the dark output is equal to a value obtained by subtracting the variant "d", which has been set in Steps S305, S307, S309, or S311, from the preliminary offset value "c", which is the peak value in the dark output corresponding to the offset included in the image signal A from the image sensor 1 and which has been stored in RAM 9 in Step S301, provided that the offset adjusting circuit 4 properly changes the offset-counterbalancing signals. Even in consideration of margins of noise and an error through the quantization operation, the peak black value "a" may be close to the above-mentioned value obtained by subtracting the variant "d" from the preliminary offset value "c". When the peak black value "a" is not close to the value obtained by subtracting the variant "d" from the preliminary offset value "c", it may be possible that the offset adjusting circuit 4 has not properly changed the offset-counterbalancing signals.

Accordingly, in Step S315, the control unit 10 determines whether an absolute value, which is obtained by subtracting a difference between the variant "d" and the preliminary offset value "c" from the present peak black value "a" in the dark output, is equal to or smaller than 2. This is to determine whether the present peak value "a" is equal to the difference between the variant "d" and the preliminary offset value "c", allowing ±2 as margins of noise and an error through the quantization operation.

When the determination result in Step S315 is YES, the process proceeds to Step S317 and the control unit 10 controls the offset adjusting circuit 4 to finally change the offset-counterbalancing signal to the one corresponding to the value of the variant "d" in Step S317. When the determination result in Step S315 is NO, the process proceeds to Step S316 and the control unit 10 sends a signal representing a fifth error, which is an offset altering error, to the error display unit 12 in Step S316. Then, the process has ended in failure.

By performing Steps S101–S317 for the third procedure of the offset/gain adjusting operation, the control unit 10 can control the offset adjusting circuit 4 to generate an offset-counterbalancing signal for making the output from the A/D converter 5 in a range from 11 to 20 and to add it to the image signal A from the image sensor 1 so that the offset of the image signal B to be input into the A/D converter 5 is adjusted to appropriate level and range from 11 to 20 which are the gray scale values converted by the A/D converter 5. This operation has one condition that the peak value in the dark output, or the offset, is in a range from 11 to 50 which are the gray scale values converted by the A/D converter 5.

Further, the control unit 10 performs the gain adjustment operation, of which operation steps are shown in FIG. 8(C) from Step S318 and following. In Step S318 of FIG. 8(C), the control unit 10 performs the peak black/white value collecting operation which is the operation performed in Step S115 shown in FIG. 4(B).

After completing the peak black/white value collecting operation in Step S318, the process proceeds to Step S319 and the control unit 10 examines the existence of at least one peak white value which is within the predetermined appropriate range from 140 to 240 at one of the phases from P0 to P7. Then, in Step S320, the control unit 10 determines the examination result of Step S319. When the examination result is determined as YES in Step S320, the process proceeds to Step S321 and the control unit 10 reads the peak black and white values stored in RAM 9 so as to select phases, which have both peak black and peak white values in the respective predetermined appropriate ranges, among all the peak black and white values stored in RAM 9. Further, in Step S321, the control unit 10 selects a phase, which has the greatest peak white value among the others, and sets the sample clock generator 6 to generate the sample clock signals at the thus-selected phase.

In the manner described above, most of the offset and gain, which is caused on the image signal A sent from the image sensor 1, can be eliminated through the offset adjusting circuit 4 and, as a result, the image signal A is converted into the image signal B. Then, the image signal B is input to the A/D converter 5 and converted into the image signal C through the sampling operation of the A/D converter 5. Accordingly, the offset and gain at the stage of the image signal C is adjusted to the level in the predetermined appropriate range. Even if the offset and gain from the image sensor 1 varies out of the predetermined appropriate range to some extent, it can be adjusted by changing the levels of offset-counterbalancing signal by the offset adjusting circuit 4 or the phases of sample clock signals generated by the sample clock generator 6.

When the examination result is determined as NO in Step S320, the process proceeds to Step S322 and the control unit 10 determines that none of the peak white values is in the predetermined appropriate range and that the gain of the image sensor 1 can not be adjusted to the predetermined appropriate range even by changing the phase of sample clocks. Further, in Step S322, the control unit 10 sends the signal representing the fourth error, which is the error of gain, or the peak white value, to the error display unit 12 so as to indicate the error status on the error display unit 12, and that the process has ended in failure.

From the various error status displayed on the error display unit 12 in accordance with the cases as indicated in Steps S303, S312, S316, and S322, the operator can recognize that the cause of failure is an excessively low or high offset level, a malfunction of the offset adjusting circuit 4 in properly altering the offset-counterbalancing signal, or no existence of a sample clock phase which can set an appropriate level of gain, thereby taking counteractions, such as a replacement of the image sensor 1, a repair of the offset adjusting circuit 4, or a replacement of the circuit boards, as suitable for the error which has occurred.

Although the image reading apparatus 100, as one of the preferred embodiments according to the present invention, uses an A/D converter 5 which is capable of 8-bit resolution, it can employ an A/D converter 5 having other resolutions such as 6-bit, 10-bit, 12-bit, or so forth, provided that the ranges for the peak black/white value may be needed to be changed in accordance with the resolution selected.

Further, the image reading apparatus 100 uses an offset adjusting circuit 4 which is capable of generating the offset-counterbalancing signal in four levels, but it can also employ an offset adjusting circuit 4 capable of generating the offset-counterbalancing signal in a greater number of levels, so as to adjust the offset more precisely into an appropriate range.

Further, the image reading apparatus 100 uses a sample clock generator 6 which is capable of generating the sample clock signals with eight phases, but it can also employ a sample clock generator 6 capable of generating the sample clocks with a greater number of phases, so as to adjust the gain more widely.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP09038638 filed in the Japanese Patent Office on Feb. 2, 1997, and the entire contents thereof are hereby incorporated by reference.

I claim:

1. An image reading apparatus, comprising:

image reading means for reading an image area by area and for generating an image signal in synchronism with clocks for timing pixels of image, said image being composed of a plurality of image areas each including a predetermined number of pixels, and said image including a reference black image, and a reference white image;

offset adjusting means for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

sample clock generating means for generating sample clock signals in a plurality of different phases in synchronism and for selecting one after another the plurality of different phases for each of the sample clock signals;

signal sampling means for sampling the offset-adjusted image signal in synchronism with the sample clock signals and for outputting a sampled image signal;

peak value detecting means for detecting a peak black value in each of the image areas included in the sampled image signal when said image reading means reads the reference black image and a peak white value in each of the image areas included in the sampled image signal when said image reading means reads the reference white image;

storing means for storing the peak black and peak white values, sampled by the sample clock signals at each of the plurality of different phases, in association with the respective corresponding phases;

first controlling means for instructing said offset adjusting means to temporarily select and set the 0-level for the offset-counterbalancing signal from among the plurality of different levels and to generate the 0-level offset-counterbalancing signal, for commanding the reading of the reference black image and the detection of a peak black value in each of the image areas included in the sampled image signal, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, and for instructing said offset adjusting means to finally set the level for the offset-counterbalancing signal to the level corresponding to the determined offset-counterbalancing value; and second controlling means for selecting, from among the plurality of different phases for the sample clocks, a phase at which both the peak black and peak white values stored in said storing means fall in the respective predetermined appropriate ranges for the peak black and peak white values, and for instructing said sample clock generating means to fix the phase for the sample clock signals to sample the offset-adjusted signal at the selected phase.

2. An image reading apparatus, comprising:

image reading means for reading an image area by area and for generating an image signal in synchronism with clocks for timing pixels of image, said image being composed of a plurality of image areas each including a predetermined number of pixels, and said image including a reference black image, and a reference white image;

offset adjusting means for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

sample clock generating means for generating sample clock signals in a plurality of different phases in synchronism and for selecting one after another the plurality of different phases for each of the sample clock signals;

signal sampling means for sampling the offset-adjusted image signal in synchronism with the sample clock signals and for outputting a sampled image signal;

peak value detecting means for detecting a peak black value in each of the image areas included in the sampled image signal when said image reading means reads the reference black image and a peak white value in each of the image areas included in the sampled image signal when said image reading means reads the reference white image;

storing means for storing the peak black and peak white values, sampled by the sample clock signals at each of the plurality of different phases, in association with the respective corresponding phases;

first controlling means for instructing said offset adjusting means to temporarily select and set the 0-level for the offset-counterbalancing signal from among the plurality of different levels and to generate the 0-level offset-counterbalancing signal, for commanding the reading the of the reference black image and the detection of a peak black value in each of the image areas included in the sampled image signal, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, and for instructing said offset adjusting means to finally set the level for the offset-counterbalancing signal to the level corresponding to the determined offset-counterbalancing value; and second controlling means for first selecting, from among the plurality of different phases for the sample clocks, a plurality of phases at which both the peak black and peak white values stored in said storing means fall in the respective predetermined appropriate ranges for the peak black and peak white values, for second selecting, from among the first selected phases, a phase in which the peak white value is the greatest among the peak white values in all the first selected phases, and for instructing said sample clock generating means to fix the phase for the sample clock signals to sample the offset-adjusted signal at the second selected phase.

3. An image reading apparatus, comprising:

image reading means for reading an image area by area and for generating an image signal in synchronism with clocks for timing pixels of image, said image being composed of a plurality of image areas each including a predetermined number of pixels, and said image including a reference black image, and a reference white image;

offset adjusting means for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

sample clock generating means for generating sample clock signals in a plurality of different phases in synchronism with and for selecting one after another the plurality of different phases for each of the sample clock signals;

signal sampling means for sampling the offset-adjusted image signal in synchronism with the sample clock signals and for outputting a sampled image signal;

peak value detecting means for detecting a peak black value in each of the image areas included in the sampled image signal when said image reading means reads the reference black image and a peak white value in each of the image areas included in the sampled image signal when said image reading means reads the reference white image;

first storing means for storing the peak black and peak white values, sampled by the sample clock signals at each of the plurality of different phases, in association with the respective corresponding phases;

second storing means for storing a preliminary offset value;

first controlling means for instructing said offset adjusting means to temporarily select and set the 0-level for the offset-counterbalancing signal from among the plurality of different levels and to generate the 0-level offset-counterbalancing signal, for first commanding the reading of the reference black image and the detection of a peak black value in each of the image areas included in the sampled image signal, for storing the detected peak black value as the preliminary offset value into the second storing means, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, for instructing said offset adjusting means to temporarily set the level for the offset-counterbalancing signal to a level corresponding to the determined offset-counterbalancing value, for second commanding another reading of the reference black image and detection of a peak black value in each of the image areas included in the sampled image signal, for comparing the peak black value from the second commanding step and a value obtained by subtracting the offset-counterbalancing value from the preliminary offset value stored in said second storing means, for instructing said offset adjusting means to finally set the level for the offset-counterbalancing signal to a temporarily-set level when a difference from the comparing step falls in a predetermined range, and for sending an error signal for indicating that said offset adjusting means is defective when a difference from the comparing step falls out of the predetermined range; and second controlling means for selecting, from among the plurality of different phases for the sample clocks, a phase at which both the peak black and peak white values stored in said first storing means fall in the respective predetermined appropriate ranges for the peak black and peak white values, and for instructing said sample clock generating means to fix the phase for the sample clock signals to sample the offset-adjusted signal at the selected phase.

4. An image reading apparatus, comprising:

image reading means for reading an image area by area and for generating an image signal in synchronism with clocks for timing pixels of image, said image being composed of a plurality of image areas each including a predetermined number of pixels, and said image including a reference black image, and a reference white image;

offset adjusting means for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

sample clock generating means for generating sample clock signals in a plurality of different phases in synchronism and for selecting one after another the plurality of different phases for each of the sample clock signals;

signal sampling means for sampling the offset-adjusted image signal in synchronism with the sample clock signals and for outputting a sampled image signal;

peak value detecting means for detecting a peak black value in each of the image areas included in the sampled image signal when said image reading means reads the reference black image and a peak white value in each of the image areas included in the sampled image signal when said image reading means reads the reference white image;

first storing means for storing the peak black and peak white values, sampled by the sample clock signals at each of the plurality of different phases, in association with the respective corresponding phases;

second storing means for storing a preliminary offset value;

first controlling means for instructing said offset adjusting means to temporarily select and set the 0-level for the offset-counterbalancing signal from among the plurality of different levels and to generate the 0-level offset-counterbalancing signal, for first commanding the reading of the reference black image and the detection of a peak black value in each of the image areas included in the sampled image signal, for storing the detected peak black value as the preliminary offset value into the second storing means, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, for instructing said offset adjusting means to temporarily set the level for the offset-counterbalancing signal to a level corresponding to the determined offset-counterbalancing value, for second commanding the reading of the reference black image and the detection of a peak black value in each of the image areas included in the sampled image signal, for comparing the peak black value from the second commanding step and a value obtained by subtracting the offset-counterbalancing value from the preliminary offset value stored in said second storing means, for instructing said offset adjusting means to finally set the level for the offset-counterbalancing signal to a temporarily-set level when a difference from the comparing step falls in a predetermined range, and for sending an error signal for indicating that said offset adjusting means is defective when a difference from the comparing step falls out of the predetermined range; and second controlling means for first selecting, from among the plurality of different phases for the sample clocks, a plurality of phases at which both the peak black and peak white values stored in said first storing means fall in the respective predetermined appropriate ranges for the peak black and peak white values, for second selecting, from among the first selected phases, a phase in which the peak white value is the greatest among the peak white values in all the first selected phases, and for instructing said sample clock generating means to fix the phase for the sample clock signals to sample the offset-adjusted signal at the second selected phase.

5. The image reading apparatus according to claim 1, wherein said second controlling means outputs a first error signal when at least one a plurality of events occurs, said events being that the peak black values stored in said first storing means in association with the respective corresponding phases fall out of the predetermined appropriate range for the peak black value at all the phases and that the peak white values stored in said first storing means in association with the respective corresponding phases fall out of the predetermined appropriate range for the peak black value at all the phases.

6. The image reading apparatus according to claim 1, wherein said first controlling means determines whether the peak black value in each of the image areas included in the sampled image signal falls out of the predetermined appropriate range for the peak black value, outputs a second error signal when the peak black value in each of the image areas included in the sampled image signal falls out of the predetermined appropriate range for the peak black value, and outputs a third error signal when the value made by subtracting the offset-counterbalancing value from the peak black value falls out of the predetermined appropriate range for the peak black value, and, further, said second controlling means outputs a fourth error signal when the peak white values stored in said first storing means in association with the respective corresponding phases fall out of the predetermined appropriate range for the peak black value at all the phases.

7. The image reading apparatus according to claim 1, further comprising error displaying means for displaying error status.

8. The image reading apparatus according to claim 1, wherein said image areas, each including a predetermined number of pixels, are lines of the image across the entire length thereof in the main scanning direction.

9. An image reading apparatus, comprising:

an image sensor for reading an image area by area and for generating an image signal in synchronism with clocks for timing pixels of image, said image being composed of a plurality of image areas each including a predetermined number of pixels, and said image including a reference black image, and a reference white image;

an offset adjusting circuit for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

a sample clock generator for generating sample clock signals in a plurality of different phases in synchronism and for selecting one after another the plurality of different phases for each of the sample clock signals;

a signal sampling circuit for sampling the offset-adjusted image signal in synchronism with the sample clock signals and for outputting a sampled image signal;

a peak value detector for detecting a peak black value in each of the image areas included in the sampled image signal when said image sensor reads the reference black image and a peak white value in each of the image areas included in the sampled image signal when said image sensor reads the reference white image;

a memory for storing the peak black and peak white values, sampled by the sample clock signals at each of the plurality of different phases, in association with the respective corresponding phases;

a first controller for instructing said offset adjusting circuit to temporarily select and set the 0-level for the offset-counterbalancing signal from among the plurality of different levels and to generate the 0-level offset-counterbalancing signal, for commanding the reading of the reference black image and the detection of a peak black value in each of the image areas included in the sampled image signal, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, and for instructing said offset adjusting circuit to finally set the level for the offset-counterbalancing signal to the level corresponding to the determined offset-counterbalancing value; and a second controller for selecting, from among the plurality of different phases for the sample clocks, a phase at which both the peak black and peak white values stored in said memory fall in the respective predetermined appropriate ranges for the peak black and peak white values, and for instructing said sample clock generator to fix the phase for the sample clock signals to sample the offset-adjusted signal at the selected phase.

10. An image reading apparatus, comprising:

an image sensor for reading an image area by area and for generating an image signal in synchronism with clocks for timing pixels of image, said image being composed of a plurality of image areas each including a predetermined number of pixels, and said image including a reference black image, and a reference white image;

an offset adjusting circuit for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

a sample clock generator for generating sample clock signals in a plurality of different phases in synchronism and for selecting one after another the plurality of different phases for each of the sample clock signals;

a signal sampling circuit for sampling the offset-adjusted image signal in synchronism with the sample clock signals and for outputting a sampled image signal;

a peak value detector for detecting a peak black value in each of the image areas included in the sampled image signal when said image sensor reads the reference black image and a peak white value in each of the image areas included in the sampled image signal when said image sensor reads the reference white image;

a memory for storing the peak black and peak white values, sampled by the sample clock signals at each of the plurality of different phases, in association with the respective corresponding phases;

a first controller for instructing said offset adjusting circuit to temporarily select and set the 0-level for the offset-counterbalancing signal from among the plurality of different levels and to generate the 0-level offset-counterbalancing signal, for commanding the reading the reference black image and the detection of a peak black value in each of the image areas included in the sampled image signal, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, and for instructing said offset adjusting circuit to finally set the level for the offset-counterbalancing signal to the level corresponding to the determined offset-counterbalancing value; and a second controller for first selecting, from among the plurality of different phases for the sample clocks, a plurality of phases at which both the peak black and peak white values stored in said memory fall in the respective predetermined appropriate ranges for the peak black and peak white values, for second selecting, from among the first selected phases, a phase in which the peak white value is the greatest among the peak white values in all the first selected phases, and for instructing said sample clock generator to fix the phase for the sample clock signals to sample the offset-adjusted signal at the second selected phase.

11. An image reading apparatus, comprising:

an image sensor for reading an image area by area and for generating an image signal in synchronism with clocks for timing pixels of image, said image being composed of a plurality of image areas each including a predetermined number of pixels, and said image including a reference black image, and a reference white image;

an offset adjusting circuit for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

a sample clock generator for generating sample clock signals in a plurality of different phases in synchronism and for selecting one after another the plurality of different phases for each of the sample clock signals;

a signal sampling circuit for sampling the offset-adjusted image signal in synchronism with the sample clock signals and for outputting a sampled image signal;

a peak value detector for detecting a peak black value in each of the image areas included in the sampled image signal when said image sensor reads the reference black image and a peak white value in each of the image areas included in the sampled image signal when said image sensor reads the reference white image;

a first memory for storing the peak black and peak white values, sampled by the sample clock signals at each of the plurality of different phases, in association with the respective corresponding phases;

a second memory for storing a preliminary offset value;

a first controller for instructing said offset adjusting circuit to temporarily select and set the 0-level for the offset-counterbalancing signal from among the plurality of different levels and to generate the 0-level offset-counterbalancing signal, for first commanding the reading of the reference black image and the detection of a peak black value in each of the image areas included in the sampled image signal, for storing the detected peak black value as the preliminary offset value into the second memory, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, for instructing said offset adjusting circuit to temporarily set the level for the offset-counterbalancing signal to a level corresponding to the determined offset-counterbalancing value, for second commanding another reading of the reference black image and the detection of a peak black value in each of the image areas included in the sampled image signal, for comparing the peak black value from the second commanding step and a value obtained by subtracting the offset-counterbalancing value from the preliminary offset value stored in said second memory, for instructing said offset adjusting circuit to finally set the level for the offset-counterbalancing signal to a temporarily-set level when a difference from the comparing step falls in a predetermined range, and for sending an error signal for indicating that said offset adjusting circuit is defective when a difference from the comparing step falls out of the predetermined range; and a second controller for selecting, from among the plurality of different phases for the sample clocks, a phase at which both the peak black and peak white values stored in said first memory fall in the respective predetermined appropriate ranges for the peak black and peak white values, and for instructing said sample clock generator to fix the phase for the sample clock signals to sample the offset-adjusted signal at the selected phase.

12. An image reading apparatus, comprising:

an image sensor for reading an image area by area and for generating an image signal in synchronism with clocks for timing pixels of image, said image being composed of a plurality of image areas each including a predetermined number of pixels, and said image including a reference black image, and a reference white image;

an offset adjusting circuit for generating an offset-counterbalancing signal in a plurality of different levels including a 0-level at which the offset-counterbalancing signal has no counterbalance effect, for selecting a level for the offset-counterbalancing signal from among the plurality of different levels in accordance with an offset included in the image signal for adjusting the offset of the image signal by adding the offset-counterbalancing signal at the selected level to the image signal, and for outputting an offset-adjusted image signal;

a sample clock generator for generating sample clock signals in a plurality of different phases in synchronism and for selecting one after another the plurality of different phases for each of the sample clock signals;

a signal sampling circuit for sampling the offset-adjusted image signal in synchronism with the sample clock signals and for outputting a sampled image signal;

a peak value detector for detecting a peak black value in each of the image areas included in the sampled image signal when said image sensor reads the reference black image and a peak white value in each of the image areas included in the sampled image signal when said image sensor reads the reference white image;

a first memory for storing the peak black and peak white values, sampled by the sample clock signals at each of the plurality of different phases, in association with the respective corresponding phases;

a second memory for storing a preliminary offset value;

a first controller for instructing said offset adjusting circuit to temporarily select and set the 0-level for the offset-counterbalancing signal from among the plurality of different levels and to generate the 0-level offset-counterbalancing signal, for first commanding the reading of the reference black image and the detection a peak black value in each of the image areas included in the sampled image signal, for storing the detected peak black value as the preliminary offset value into the second memory, for determining an offset-counterbalancing value such that a value made by subtracting the offset-counterbalancing value from the peak black value falls within a predetermined appropriate range for the peak black value, for selecting a level for the offset-counterbalancing signal from among the plurality of different levels in accordance with the determined offset-counterbalancing value, for instructing said offset adjusting circuit to temporarily set the level for the offset-counterbalancing signal to a level corresponding to the determined offset-counterbalancing value, for second commanding another reading of the reference black image and the detection a peak black value in each of the image areas included in the sampled image signal, for comparing the peak black value from the second commanding step and a value obtained by subtracting the offset-counterbalancing value from the preliminary offset value stored in said second memory, for instructing said offset adjusting circuit to finally set the level for the offset-counterbalancing signal to a temporarily-set level when a difference from the comparing step falls in a predetermined range, and for sending an error signal for indicating that said offset adjusting circuit is defective when a difference from the comparing step falls out of the predetermined range; and a second controller for first selecting, from among the plurality of different phases for the sample clocks, a plurality of phases at which both the peak black and peak white values stored in said first memory fall in the respective predetermined appropriate ranges for the peak black and peak white values, for second selecting, from among the first selected phases, a phase in which the peak white value is the greatest among the peak white values in all the first selected phases, and for instructing said sample clock generator to fix the phase for the sample clock signals to sample the offset-adjusted signal at the second selected phase.

13. The image reading apparatus according to claim 8, wherein said second controller outputs a first error signal when at least one of a plurality of events occurs, said events being that the peak black values stored in said first memory in association with the respective corresponding phases fall out of the predetermined appropriate range for the peak black value at all the phases and that the peak white values stored in said first memory in association with the respective corresponding phases fall out of the predetermined appropriate range for the peak black value at all the phases.

14. The image reading apparatus according to claim 8, wherein said first controller determines whether the peak black value in each of the image areas included in the sampled image signal falls out of the predetermined appropriate range for the peak black value, outputs a second error signal when the peak black value in each of the image areas included in the sampled image signal falls out of the predetermined appropriate range for the peak black value, and outputs a third error signal when the value made by subtracting the offset-counterbalancing value from the peak black value falls out of the predetermined appropriate range for the peak black value, and, further, said second controller outputs a fourth error signal when the peak white values stored in said first memory in association with the respective corresponding phases fall out of the predetermined appropriate range for the peak black value at all the phases.

15. The image reading apparatus according to claim 8, further comprising an error display for displaying error status.

16. The image reading apparatus according to claim 8, wherein said image areas, each including a predetermined number of pixels, are lines of the image across the entire length thereof in the main scanning direction.

17. An image reading apparatus, comprising:
  image reading means for reading an image and generating an image signal;
  offset adjusting means for selecting one of a plurality of offset-counterbalancing signals having different levels and adjusting the image signal by adding the offset-counterbalancing signal thereto to produce an offset-adjusted image signal;
  controlling means for indicating to said offset adjusting means the level of offset-counterbalancing signal to be selected.

18. An image reading apparatus according to claim 17, further comprising;
  a sample clock generating means for generating sample clock signals having different phases;
  signal sampling means for sampling the offset adjusted image signal to produce a sampled image signal;
  peak value detecting means for detecting peak values in the sampled image signal;
  storing means for storing the peak values; and
  second controlling means for selecting a sample clock signal having a phase which causes the stored peak values to fall in a predetermined range.

* * * * *